United States Patent [19]

Crane et al.

[11] 4,035,999
[45] July 19, 1977

[54] CROP MATERIAL ROLL FORMING METHOD AND MACHINE

[76] Inventors: Jack W. Crane, Rte. 2, New Holland, Pa. 17557; Aquila D. Mast, 1316 Clayton Road, Lancaster, Pa. 17603

[21] Appl. No.: 656,758

[22] Filed: Feb. 9, 1976

[51] Int. Cl.² ............................................. A01D 43/02
[52] U.S. Cl. .......................................... 56/341; 56/1; 100/77
[58] Field of Search .............. 56/1, DIG. 1, 341–343; 100/88, 70 R, 77

[56] References Cited

U.S. PATENT DOCUMENTS

| 703,470 | 7/1902 | Rembert | 100/77 |
| 3,004,377 | 10/1961 | Harrer | 56/341 |

*Primary Examiner*—Russell R. Kinsey

*Attorney, Agent, or Firm*—John R. Flanagan; Frank A. Seemar; Michael R. Swartz

[57] ABSTRACT

A roll forming machine picks up crop material and forms, twine wraps and discharges rolls or large round bales thereof as the machine is continuously moving across the field. The machine has front and rear roll forming chambers. Crop material is being continuously delivered either through the front chamber to the rear chamber of the machine wherein formation of a roll is being completed or to the front chamber of the machine wherein formation of a roll is being initiated as the completely formed roll located in the rear chamber is being twine wrapped and then discharged from the machine. Once the rear roll has been wrapped and discharged from the rear chamber and when the roll in the front chamber reaches a predetermined diameter size, the partially formed roll in the front chamber is then transferred to the rear chamber where formation thereof is continued.

34 Claims, 33 Drawing Figures

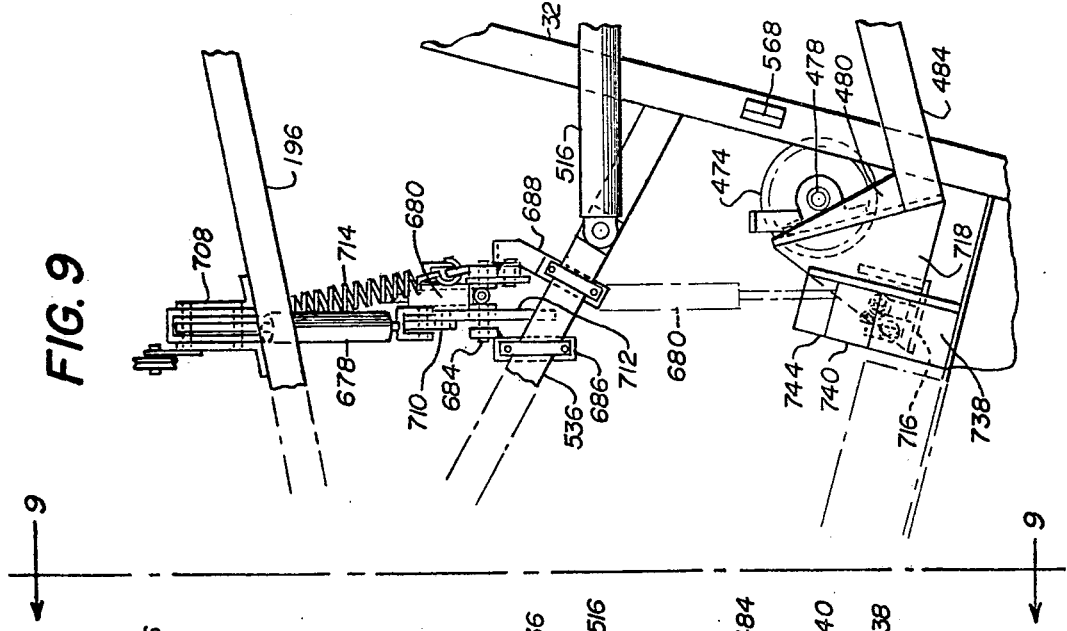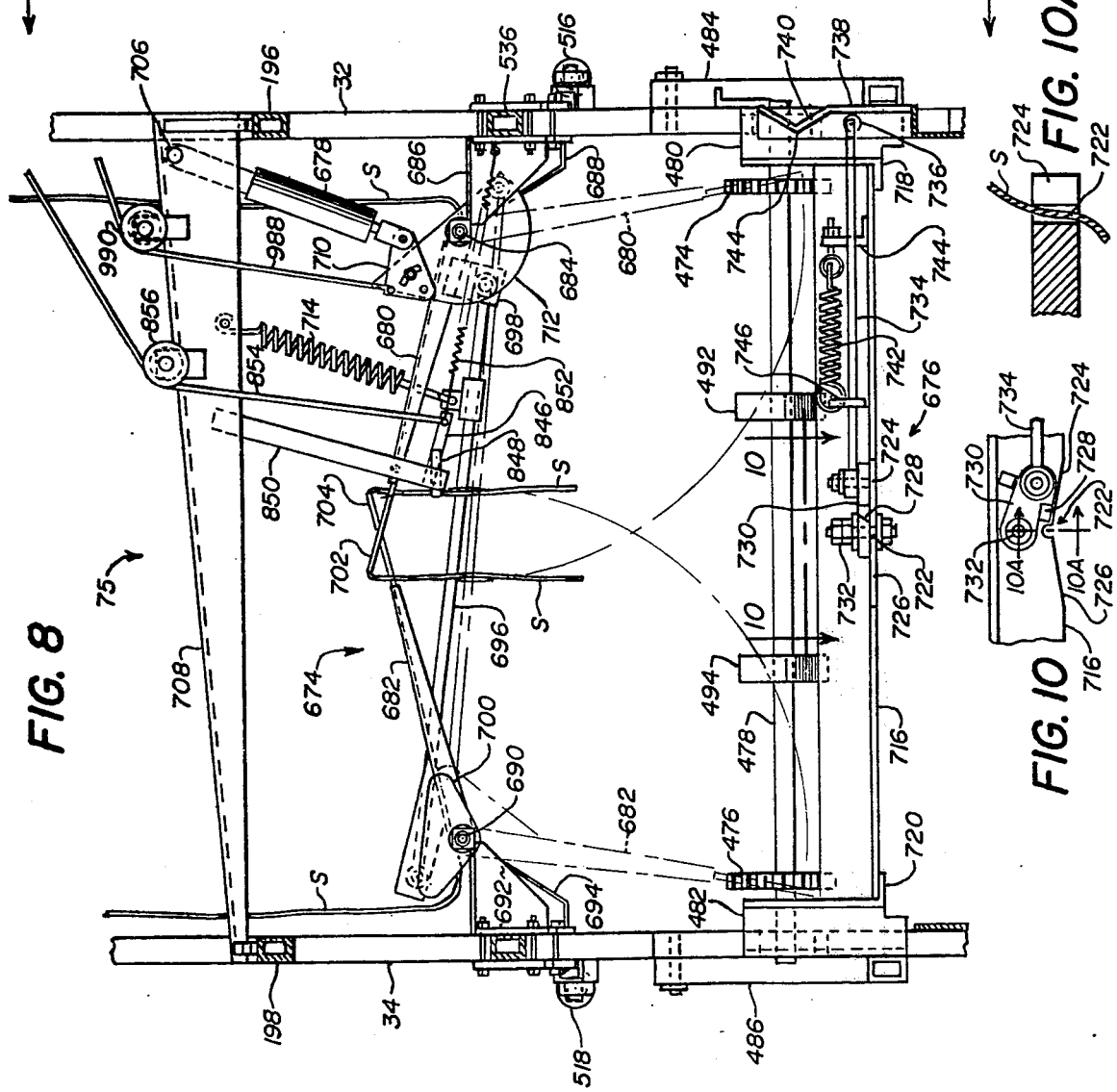

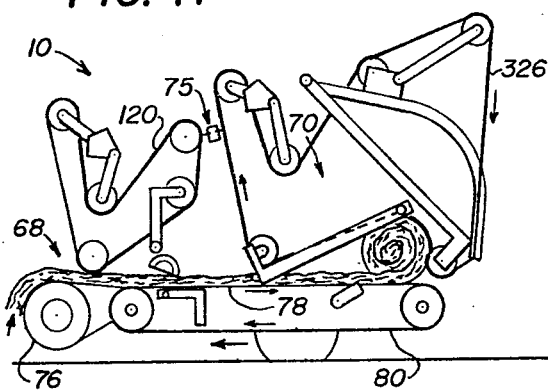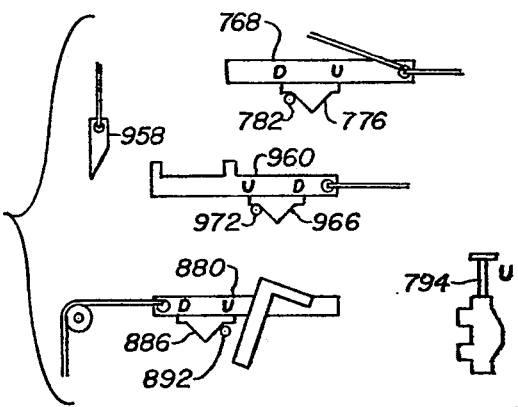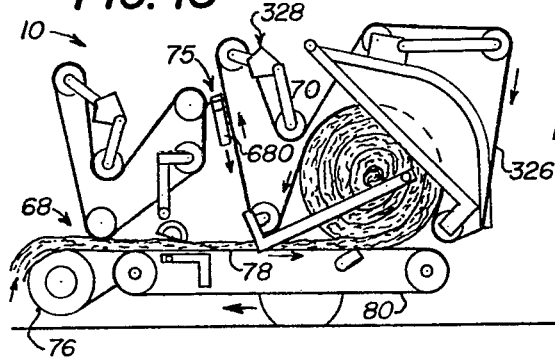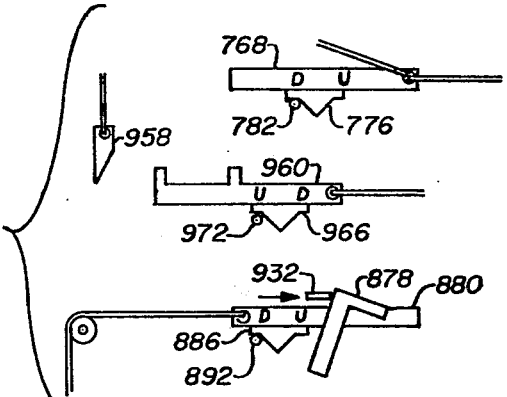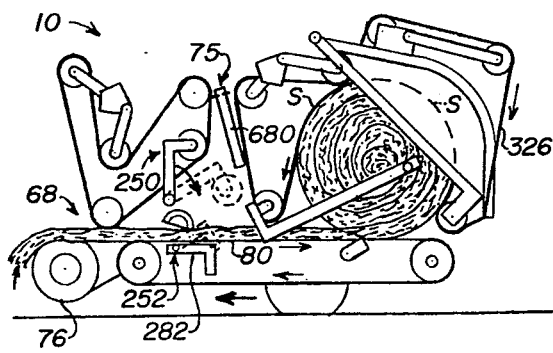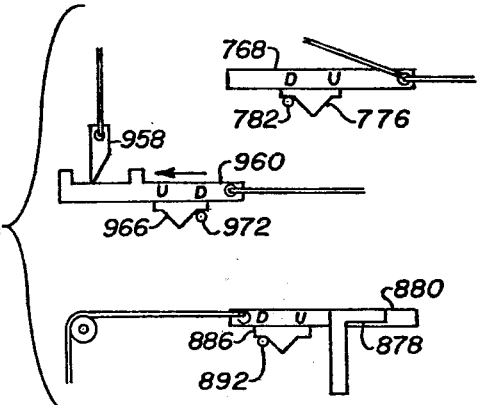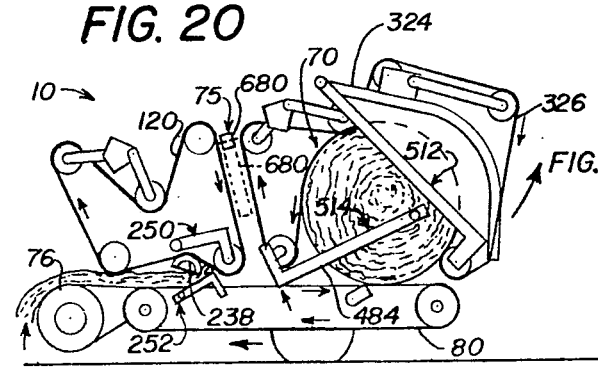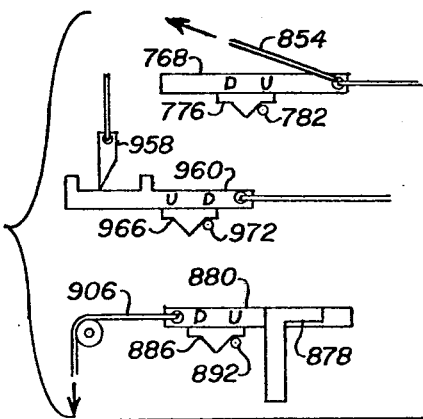

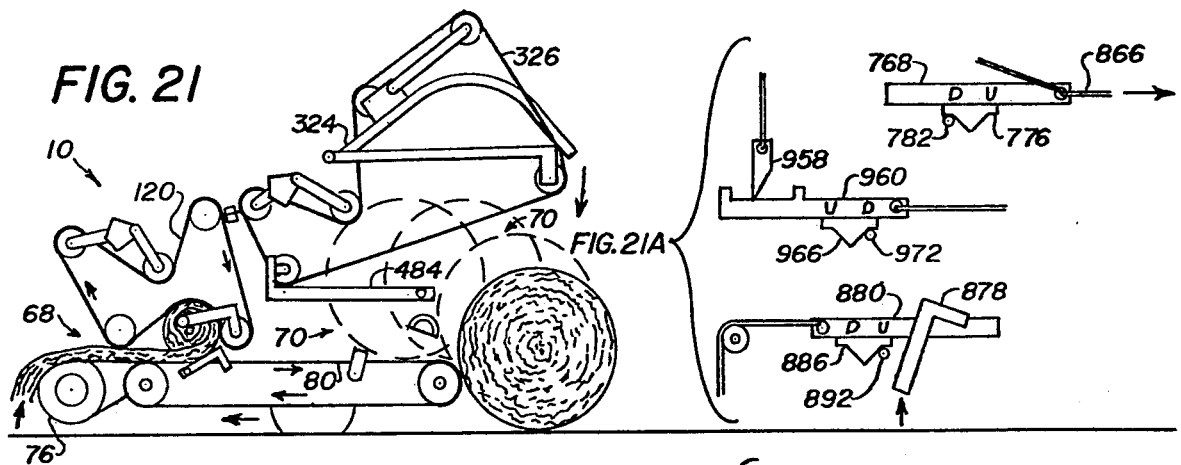
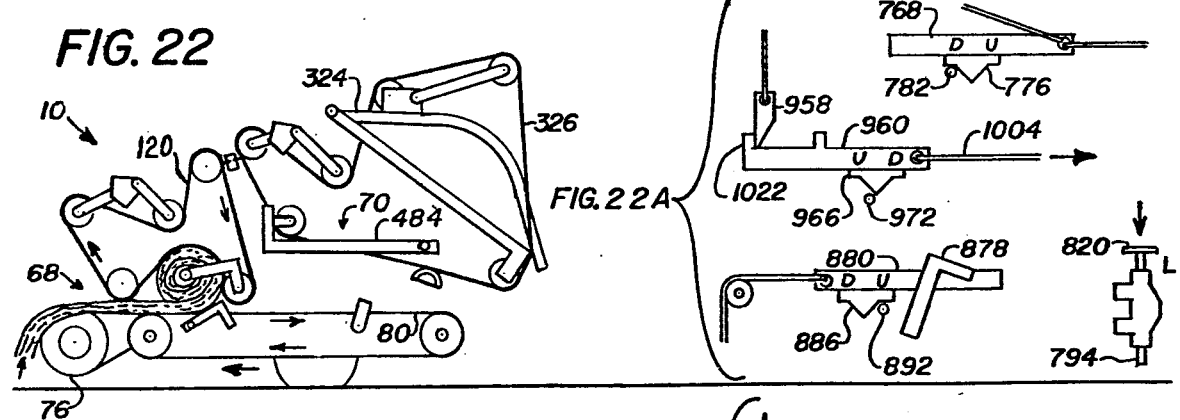
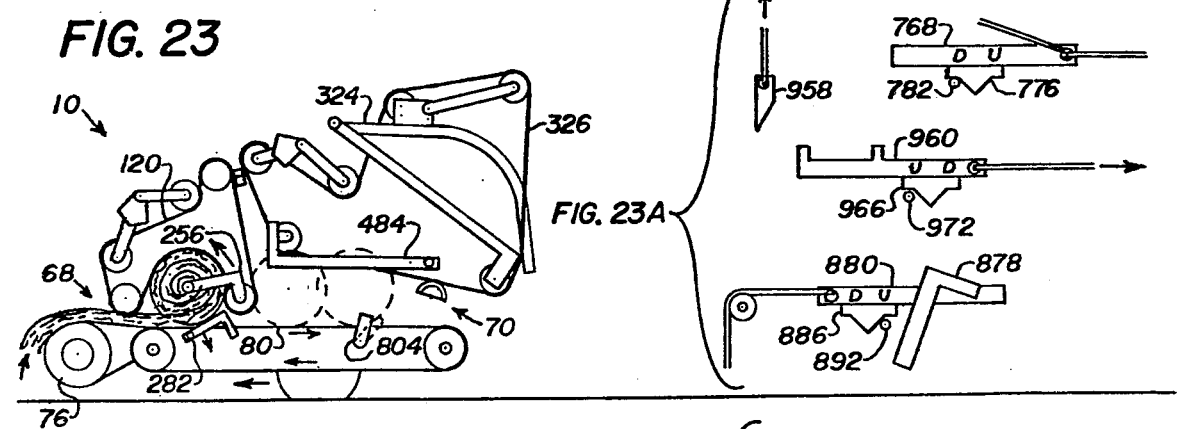
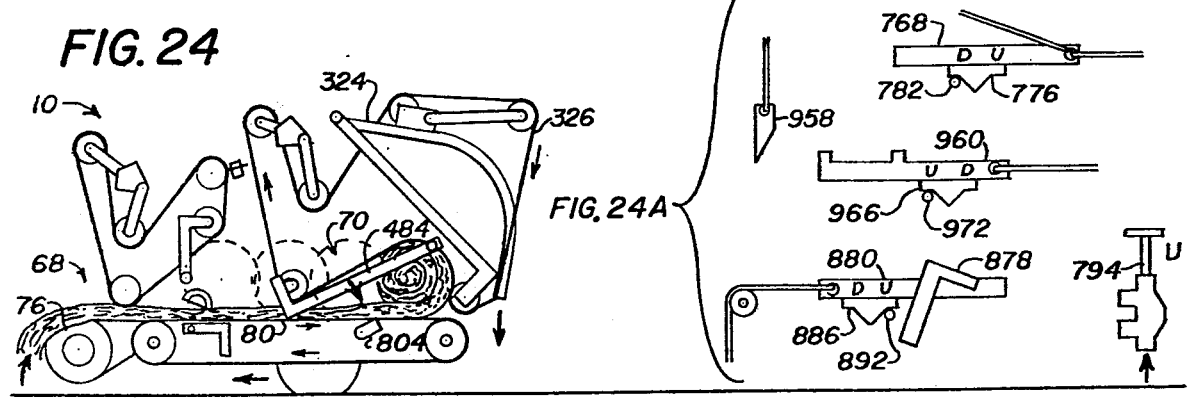

CROP MATERIAL ROLL FORMING METHOD AND MACHINE

CROSS REFERENCES TO RELATED APPLICATIONS

Reference is hereby made to the following co-pending U.S. applications dealing with related subject matter and assigned to the assignee of the present invention:

1. "Synchronizing Roll Forming and Wrapping Operations in a Crop Material Roll Forming Machine" by Aquila D. Mast, U.S. Ser. No. 656,661, filed Feb. 9, 1976.
2. "Controlling the Size of a Roll Core Formed in a Crop Material Roll Forming Machine" by Wilson L. Strausser et al, U.S. Ser. No. 656,663, filed Feb. 9, 1976.
3. "Front and Rear Upper Aprons in a Crop Material Roll Forming Machine" by Aquila D. Mast, U.S. Ser. No. 656,687, filed Feb. 9, 1976.
4. "Material Layer Diverting Means for a Crop Material Roll Forming Machine" by Aquila D. Mast, U.S. Ser. No. 656,752, filed Feb. 9, 1976.
5. "Mechanism for Opening and Closing a Crop Material Roll Forming Region in a Roll Forming Machine" by Robert L. Rice et al, U.S. Ser. No. 656,753, filed Feb. 9, 1976.
6. "Raising and Lowering Mechanism for the Rear Chamber in a Crop Material Roll Forming Machine" by Robert L. Rice et al, U.S. Ser. No. 656,759, filed Feb. 9, 1976.
7. "Bale Actuated Control for the Rear Roll Forming Chamber in a Crop Material Roll Forming Machine" by Aquila D. Mast, U.S. Ser. No. 656,760, filed Feb. 9, 1976.

BACKGROUND OF THE INVENTION

1. Field of the Invention

The present invention relates generally to the art of harvesting loose crop material and, more particularly, is concerned with a method and machine for forming rolls of crop material, such as large round bales of hay or the like.

2. Description of the Prior Art

Several decades ago, small roll balers for forming small rolls or round bales of crop material were reasonably popular for a short time as one method of harvesting crop material, such as hay or the like. However, small roll balers failed to successfully compete over the long run with the predomonate method of harvesting hay, that being, the utilization of automatic type balers that form the hay into small wire- or twine-tied rectangular bales. Consequently, the small roll baler method of harvesting hay has since substantially faded from the hay harvesting scene.

In recent years, the practice of harvesting hay by forming it into large rolls through the use of large roll or round balers has become increasingly popular. One type of large round baler forms a swath or windrow of hay into a large cylindrical roll or round bale while the latter is supported on the ground. Another type of large round baler picks up the swath or windrow of hay and forms it into a large round bale off the ground. Both of these types of large round balers generally have mechanisms for applying twine or similar binding material about the bale once it has reached its desired maximum size. Then, in the case of both types of balers, the wrapped bale is discharged from the baler.

In the case of the on-the-ground type of large round baler known up to the present, the baler must be guided away from the windrowed crop material during the time the twine wrapping and bale discharging operations are being carried out since this type of baler is not capable of receiving additional hay until these operations are completed.

In the case of the off-the-ground type of large round baler known up to the present, the forward movement of the baler must be temporarily suspended or halted until the twine wrapping and bale discharging operations have been completed since this type of baler is also not capable of receiving additional hay during the performance of these operations.

Under certain field and crop conditions, the amount of time consumed in wrapping and discharging bales may approach twenty-five percent of that spent in actually rolling or forming the hay into individual bales when utilizing either of the on-the-ground or off-the-ground types of large round balers. It is readily apparent that such state of affairs creates a serious limitation on the potential, long term bale production capability of the large round balers. The same was generally true also in the case of the now obsolete small round balers.

One attempt to obviate the above-described limitation was proposed in U.S. Pat. No. 3,004,377 in connection with the small round baler. Such proposal related to the provision of auxiliary conveyor means on the baler to accumulate hay being picked up, by circulating it in an endless path on the baler away from the bale forming mechanism, while the bale wrapping and discharging phases of the baler operations are being carried out at the location of the bale forming mechanism. Then, once the latter operations are completed, it was envisioned that hay accumulated on the baler would be fed into the bale forming mechanism of the baler along with hay being picked up from the field to form another roll or round bale.

However, certain critical drawbacks are presented by the above-described proposal. First, the continuous circulation of the incoming hay by the auxiliary conveyor, while wrapping and discharging of the roll from the bale forming mechanism is being carried out, will likely result in substantial leaf losses in such portions of the hay due to over-handling thereof. Second, it is quite likely that more than enough hay to form a bale will soon become accumulated in the auxiliary conveyor of the baler and therefore periodically the machine will probably have to be operated while its forward movement is stopped in order to clean out the auxiliary conveyor. Consequently, the operator would have to give some attention to the auxiliary conveyor part of the baler in order to know when to do this. Third, the continuous circulation of the hay in loose form by the auxiliary conveyor makes it very difficult to maintain the degree of control over the circulating hay that is necessary in order to subsequently to able to carry out smooth feeding of the accumulated hay into the bale forming mechanism of the baler along with hay being picked up from the field.

SUMMARY OF THE INVENTION

The present invention substantially overcomes the above-described limitation associated with prior art round balers by providing a roll forming method and machine utilizing two crop material roll forming chambers, a front chamber in which roll formation is initiated and a rear chamber in which roll formation is completed. Roll forming operations in the two chambers are synchronized in a manner that allows for continuous movement of the machine across the field and delivery of crop material to the machine even during the performance of roll wrapping and discharging operations by the machine.

Furthermore, the present invention substantially avoids the drawbacks of the solution proposed in the aforesaid patent by constantly adding the incoming crop material to a roll being compactly formed in either the front chamber or rear chamber. Specifically, with respect to the present invention, the fact that, during twine wrapping and discharging of a completed roll from the rear chamber, another roll is being partially formed in the front chamber which will become the core or center portion of the roll to be subsequently completed in the rear chamber demonstrates that there is no over-handling of the crop material. Consequently, there is no appreciably greater leaf losses experienced in connection with the present invention than that experienced with prior art round balers. Also, with respect to the present invention, the fact that incoming crop material is always being formed or added into a compact mass makes it relatively easy to maintain substantially constant control over the material while in the machine.

Because of the various unique features incorporated in the machine disclosed therein, the operations performed in the front and rear chambers of the machine may be coordinated with each other so as to insure that one operation will not periodically impede or adversely affect another. Instead, the machine operator may reasonably expect the same sequence of operations to be efficiently carried out repetitively by the machine.

While these unique features are particularly adapted for facilitating the continuous roll forming method and machine which comprises the present invention, it is readily apparent that some of such features may be incorporated, either singly or together into conventional round balers and thereby improve the same. Also, some of these features comprise inventions claimed in other copending applications, cross-referenced above; however, all are illustrated and described herein for facilitating a complete and thorough understanding of the method and machine of the present invention.

Accordingly, the method of the present invention relates to the forming of crop material rolls by a mobile machine adapted to move across a field and having first and second roll forming chambers and broadly comprises the steps of moving the machine across the field, delivering crop material to the machine, completing formation of a roll of the crop material in the second chamber and initiating formation of another roll of crop material in the first chamber prior to the termination of completing formation of the preceding roll in the second chamber. Further, the completing step includes the step of wrapping the roll with twine or the like in the second chamber and is terminated by the step of discharging the roll from the second chamber. Still further, the method includes the step of transferring the roll from the first chamber to the second chamber after discharge of the roll from the second chamber.

The present invention also relates to a crop material roll forming machine which is broadly comprised by a mobile frame adapted to move across a field, means on the frame for delivering crop material to the machine, first means on the frame for initiating formation of a roll of crop material, and second means on the frame for completing formation of the roll, the first means being operable to initiate formation of another roll prior to completion of the preceding roll by the second means. Further, means is provided on the frame which is operable to cause wrapping of the roll with twine or the like prior to its completion by the second means. Still further, the second means is operable to discharge the roll upon its completion and means is provided on the frame for causing transfer of the roll from the first means to the second means after discharge of the completed roll by the second means.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 8 is an enlarged, fragmentary, front elevational view taken along line 8—8 of FIG. 1, showing twine wrapping mechanism of the machine;

FIG. 9 is a left side elevational view taken along line 9—9 of FIG. 8;

FIG. 10 is a fragmentary, plan view taken along line 10—10 of FIG. 8;

FIG. 10A is an enlarged, fragmentary sectional view taken along 10A—10A in FIG. 10, showing the positional relationship of the twine strands through the notch;

FIGS. 17 through 24 are schematic representation of the machine of FIG. 1, showing successive stages of the operations performed by the machine, as it is moved across a field, in continuously forming, wrapping and discharging large rolls or round bales of crop material; and FIGS. 17A through 24A are schematic representations of various ones of the control components of the machine of FIG. 1, showing the respective relative positions of the components at the various stages of the operations performed by the machine correspondingly depicted in FIGS. 17 through 24.

DETAILED DESCRIPTION OF THE PREFERRED EMBODIMENT

In the following description, right hand and left hand references are determined by standing at the rear of the machine and facing in the direction of foward travel. Also, in the following description, it is to by understood that such terms as "forward," "rearward," "left," "upward," etc., are words of convenience and are not to be construed as limiting terms.

IN GENERAL

Figure 1:
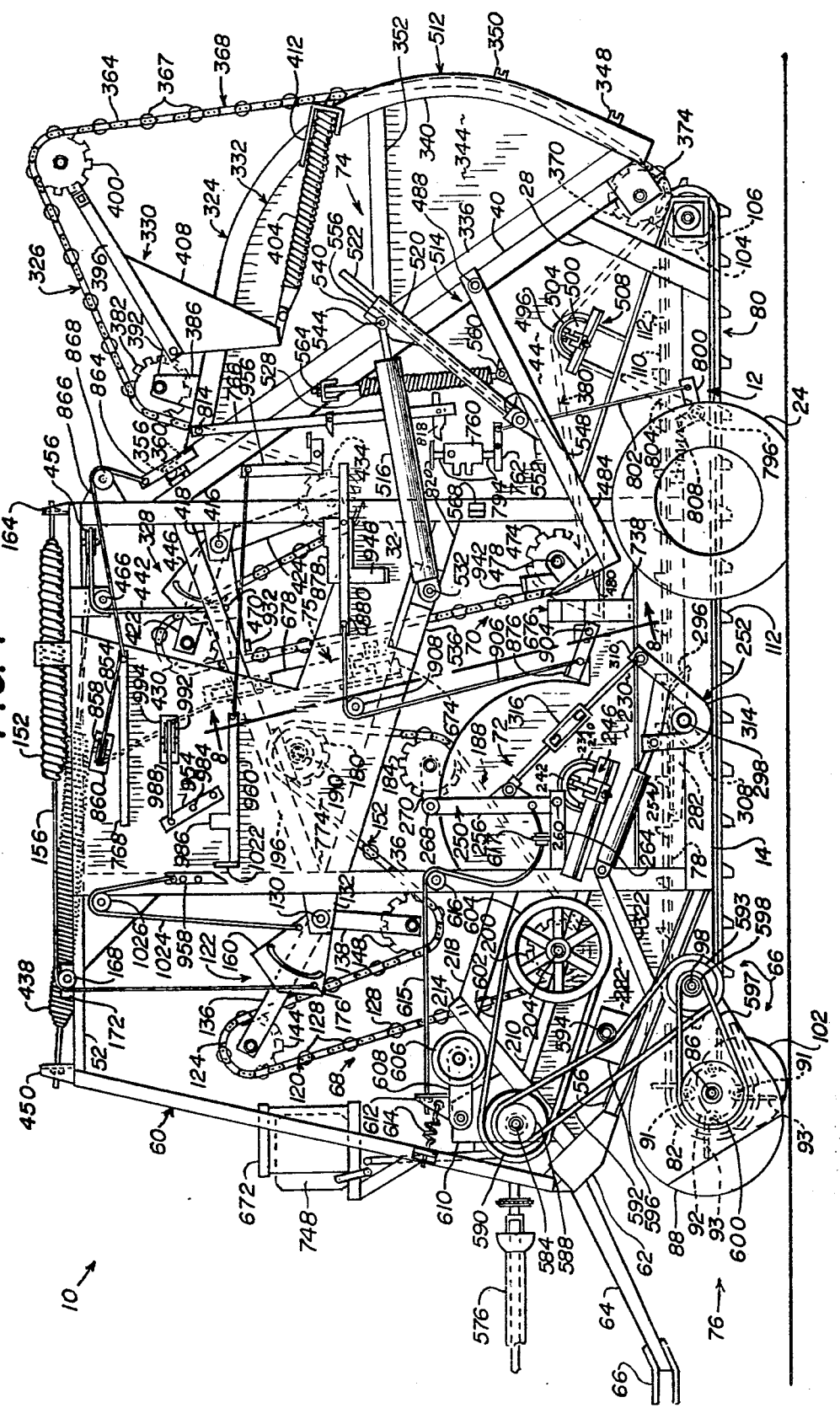
FIG. 1 is a left side elevational view of a crop material roll forming machine embodying the principles of the present invention.
Figure 2:
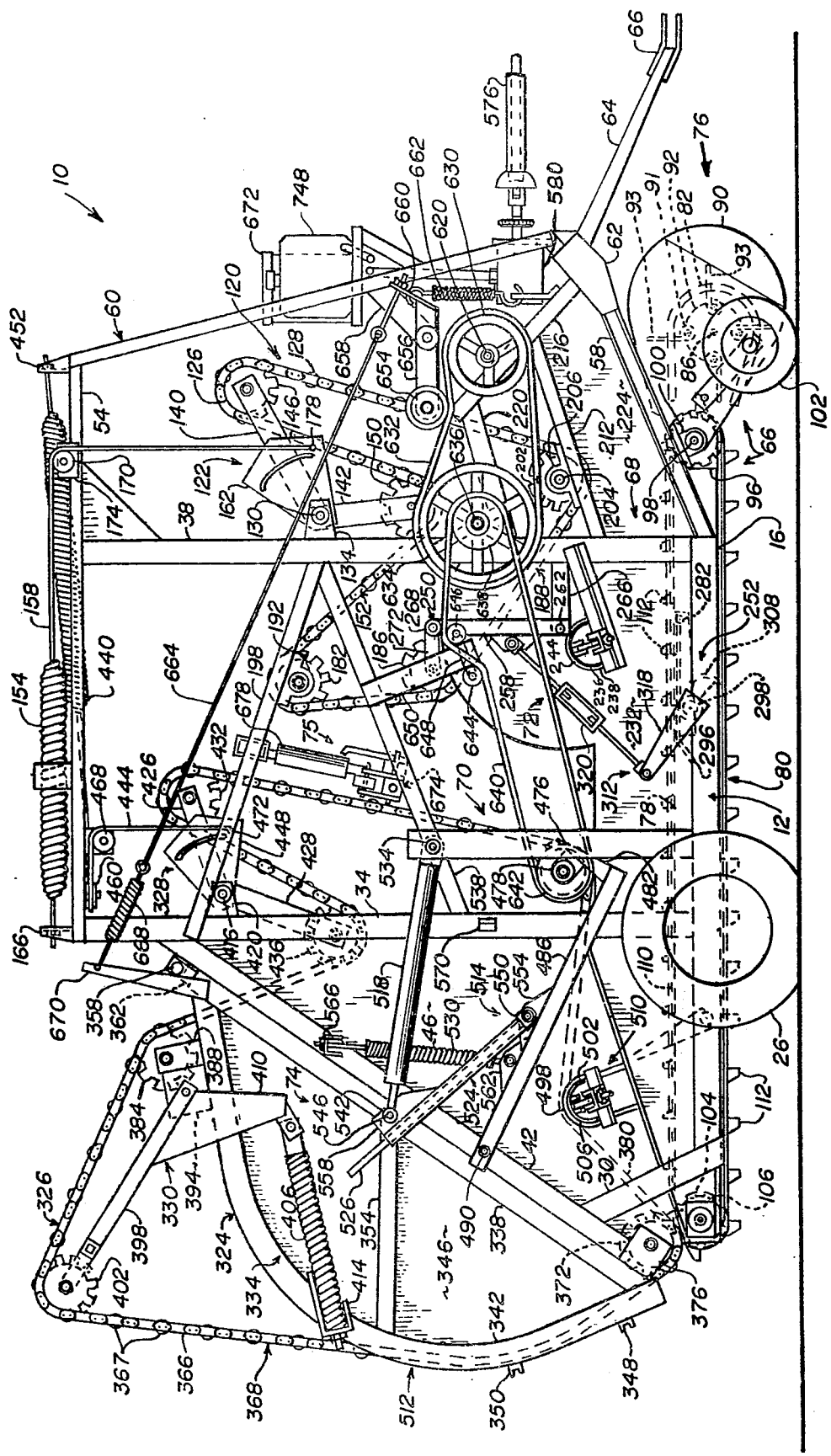
FIG. 2 is a right side elevational view of the machine of FIG. 1.

Referring now to the drawings, and particularly to FIGS. 1 and 2, there is shown a machine for forming crop material such as hay or the like into rolls, commonly referred to as large compact round bales, the machine being indicated generally by numeral 10 and comprising the preferred embodiment of the present invention (the left side of the machine being shown in FIG. 1 and the right side in FIG. 2 when one is standing to the rear of the machine and facing in the direction of forward travel).

The machine 10 is provided with a mobile frame, generally indicated at 12, which includes left and right longitudinally extending rails 14,16 and transverse pipes (not shown) which interconnect the longitudinal rails 14,16. The longitudinal rails 14,16 are respectively supported by left and right ground wheels 24,26 being rotatably mounted to respective stub shafts (not shown), each of which is secured to and extends outwardly from one of the longitudinal rails 14,16 at an intermediate location therealong.

The frame 12 further includes various upright structures respectively connected at their lower ends to the longitudinal rails 14,16, namely, short rearwardly-inclined left and right rear channels 28,30, left and right middle upright rails 32,34 and left and right front upright beams 36,38.

The upper ends of corresponding left and right short rear channels 28,30 and middle upright rails 32,34 are respectively interconnected by forwardly-inclined left and right side beams 40,42, with left and right rear side sheets 44,46 respectively about their peripheries to corresponding left and right longitudinal rails 14,16, short rear channels 28,30, middle upright rails 32,34 and side beams 40,42 so as to close the side openings respectively formed by these latter interconnected structures.

Also, an upper rectangular frame structure (see FIG. 6), including front and middle cross tubes 48,50 and left and right side tubes 52,54, extends between and interconnects with middle upright rails 32,34 and front upright beams 36,38 at the upper ends thereof.

The frame 12 at its forward end includes left and right forwardly-inclined support beams 56,58 which are respectively secured at their rear ends to the lower ends of left and right front upright beams 36,38 and at their front ends to the lower end of a front rack structure 60 which is secured at its upper end to front cross tube 48.

A transverse tubular beam 62 also extends between and interconnects with the front ends of left and right support beam 56,58. At an intermediate location along the transverse beam 62 is secured a forwardly-extending tongue 64 for the machine 10 having a hitch element 66 at its forward end which adapts the mobile frame 12 to be secured to a tractor, or other towing vehicle, located at the front thereof. While the preferred embodiment of the machine 10 described and illustrated herein is a pull-type unit, it should be understood that the mobile frame 12 could readily be modified to form a self-propelled unit.

Also, the machine 10 is provided on its mobile frame 12 with crop material delivery means, generally designated 66, which defines the bottom for two tandemly-arranged roll forming chambers, namely, a first or front roll forming chamber, generally designated by numeral 68, and a second or rear roll forming chamber, generally designated by numeral 70. The crop material delivery means moves crop material from the field into one or both of the roll forming chambers 68,70. Further, a first or front chamber opening-and-closing mechanism, generally designated 72, is provided on the mobile frame 12 in operative association with the first chamber 68, and a second or rear chamber opening-and-closing mechanism, generally designated 74, is provided on the mobile frame 12 in operative association with the second chamber 70. Still furhter, a twine wrapping mechanism, generally designated 75, is provided on the mobile frame 12 being located generally above the delivery means 66 and between the chambers 68,70.

The components of the delivery means 66, chambers 68,70, the opening-and-closing mechanisms 72,74, and the wrapping mechanism 75 and well and drive means and control components which synchronize the operations performed with the machine 10, will be described in detail hereinafter. Following thereafter, the systematic operations performed by the machine 10 during its continuous, non-stop formation, wrapping and discharge of crop material rolls, commonly referred to as large round bales, will be described in detail.

CROP MATERIAL DELIVERY MEANS

Figure 3:
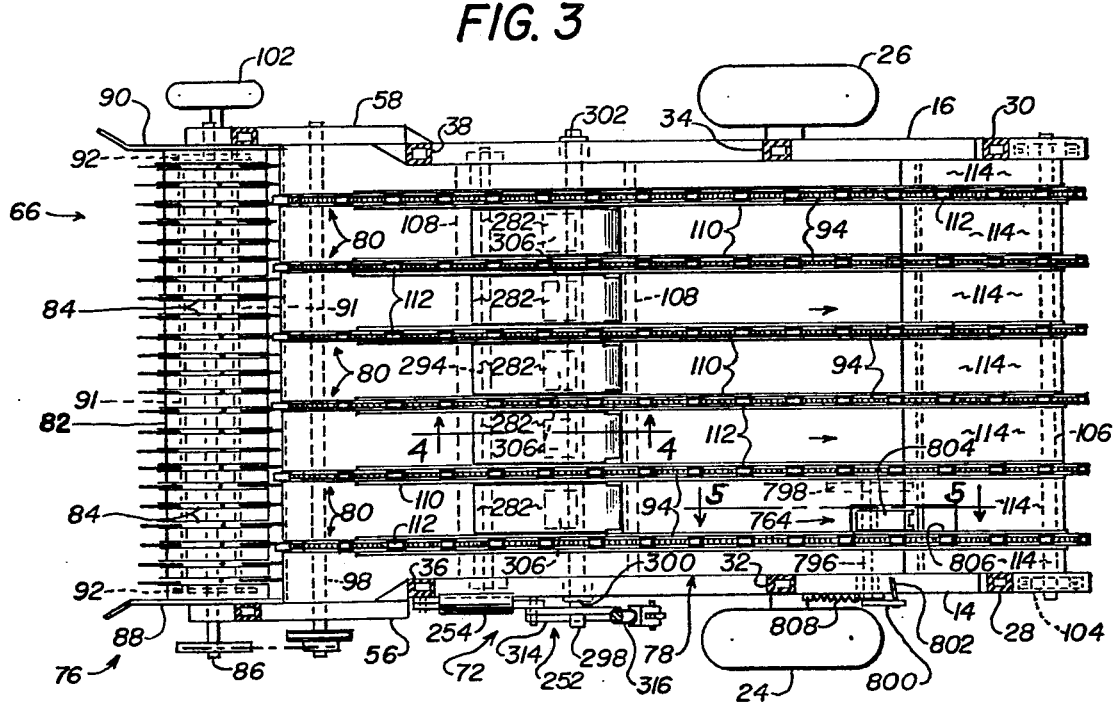
FIG. 3 is a plan view of the lower portion of the machine of FIG. 1, on a slightly smaller scale, showing the pickup unit, floor and lower apron, the front chamber floor ramps and the rear chamber bale trip mechanism.

Referring still to FIGS. 1 and 2, but more particularly to FIG. 3, the crop material delivery means 66 includes a crop material pickup unit 76 mounted at the lower front end of the mobile frame 12 and crop material conveying means extending between the ends of the mobile frame 12 comprising a floor 78 fixedly mounted between longitudinal rails 14,16 of mobile frame 12 and extending from adjacent the rear side of the pickup unit 76 to the rear end of the mobile frame 12, and a lower conveyor or apron, generally designated 80, mounted to the mobile frame 12 for movement along an endless path extending along the upper and lower surfaces of the floor 78 and about opposite ends of the floor 78.

The pickup unit 76 is a conventional type, including a horseshoe-shaped drum 82 having a series of transversely spaced, circumferential slots 84 (FIGS. 3 and 6) and a central transverse shaft 86 within the drum being rotatably mounted to vertical side panels 88,90 connected to opposite ends of the drum 82. A series of cam-actuated bars 91 extend transversely between and are rotatably mounted at their opposite ends in circular plates 92 disposed adjacent the ends of shaft 86. The bars 91 mount spaced apart spring tines or fingers 93 which extend outwardly through the series of slots 84 and traverse about a endless clockwise path, as viewed in FIG. 2, the lower portion of which is close to the field, as the shaft 86, bars 91, and plates 92 are rotated which results in fingers 93 continuously picking up a swath or windrow of crop material from the field and feeding it rearwardly over the top surface of the drum 82 and onto the front end of the floor 78 and lower apron 80 as the machine 10 moves across the field. The drive arrangement for the shaft 86 of the pickup unit 76 will be described later on.

The lower apron 80 preferably comprises a series of endless, flexible link-type chains 94 (FIGS. 3 and 6) which are transversely spaced apart even distances and respectively extend around driven sproket gears 96 which are mounted to a driven shaft 98 which is rotatably supported adjacent the forward end of the floor 78 in bearings mounted respectively in brackets 100 (only right bracket 100 being shown in FIG. 2) fixed respectively to the undersides of support beams 56,58. The drive arrangement for the driven shaft 98 will be described later.

Also, the pickup unit 76 is pivotally supported at the rearward ends of its side panels 88,90 upon the lower apron driven shaft 98 by bearing brackets (not shown) which fit about the shaft 98 and are fastened to the respective side panel rearward ends. The forward end of the pickup unit 76 is yieldably restrained against downward movement by a spring (not shown) secured as its upper end to the right support beam 56 and at its lower end to the right side panel 90. Also, a ground wheel 102 is rotatably mounted to right side panel 90 for supporting the pickup unit 76 on the field.

At the rear end of the floor 78, cylindrical guide members 104 are formed on transverse tube 106 which extends between and is mounted to opposite sides sheets 44,46 to provide rear guide means around which chains 94 extend.

The floor 78 is supported by a series of channel beams 108 (FIG. 4) which are connected to and extend transversely between longitudinal rails 14,16. The upper courses of the chains 94 (being seen in FIG. 3) preferably slide within channels 110 which are fixed on the upper surface of the floor 78 while the lower courses of the chains 94 extend along the lower surface of the floor 78.

Each of the chains 94 comprising the lower apron 80 has aggressive type lugs 112 connected thereto at longitudinally-spaced positions therealong which project vertically-outwardly from the chain 94. The upper courses of the chains 94 move from the front to rear in the direction of the arrows shown in FIG. 3 and the lugs aggressively engage the crop material received from the pickup unit 76 for delivering it in a rearward direction and also aggressively engage the roll or rolls of crop material being formed in the rear chamber 70 or in both the front and rear chambers 68,70, as will be described in detail later, in order to facilitate rotary movement of the roll or rolls in a counterclockwise direction, as viewed in FIG. 1. Such engagement of the lugs 112 with the roll also tends to align the stems and fibers of the crop material in substantially circumferential relationship about the roll to provide a substantial tendency for the completed roll to shed moisture when lying in the field.

Figure 7:
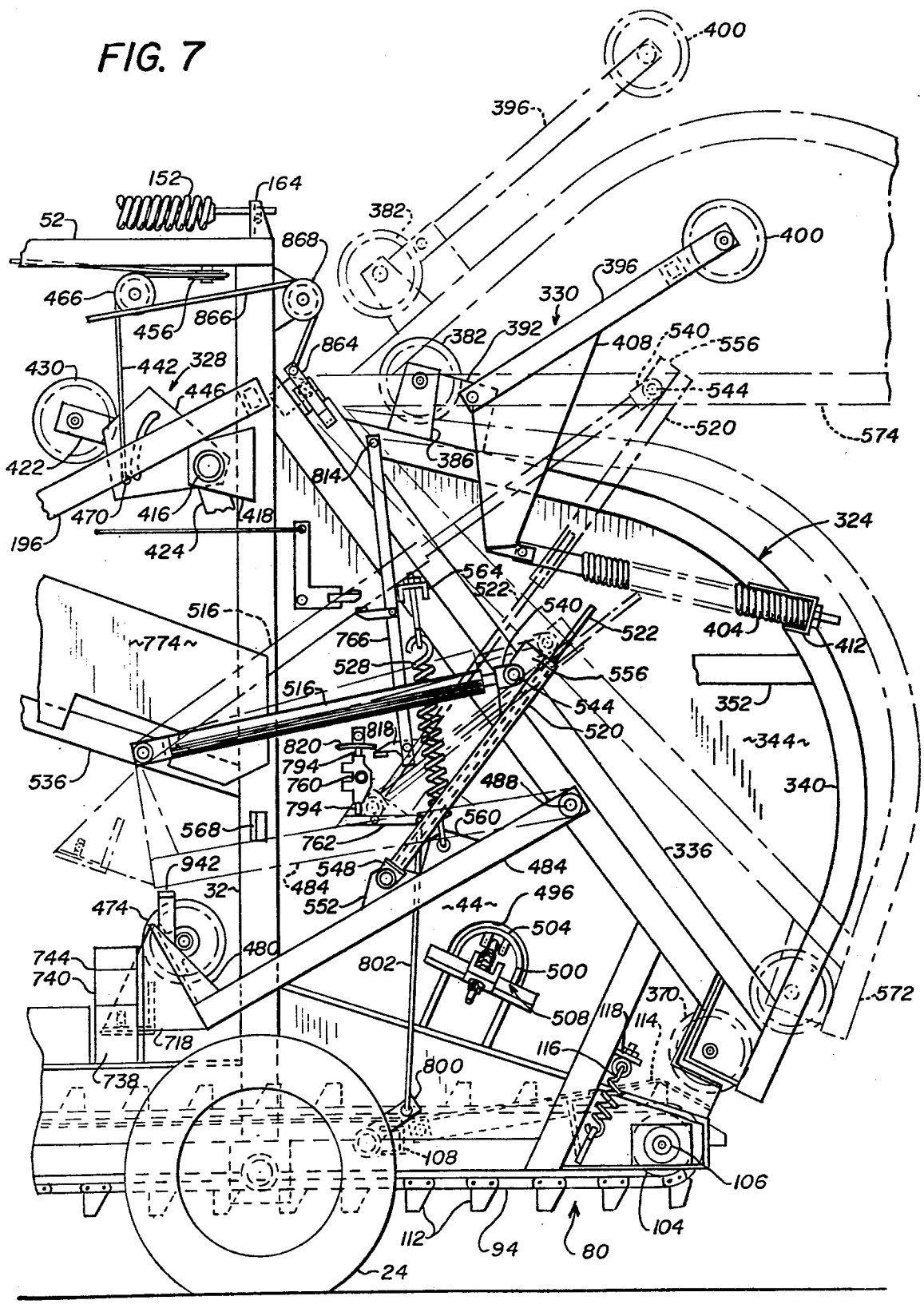
FIG. 7 is an enlarged, left side elevational view of the rear half of the machine of FIG. 1, showing the various relative positions of the rear chamber opening-and-closing mechanism.

The rear of discharge end of the floor 78 has terminal supporting means comprising a series of similar plates 114 (FIG. 3 and 7) mounted at their forward ends to the rearmost one of transverse beams 108 and yieldably urged upwardly to normally assume rearwardly-inclined positions, such as seen in FIG. 7, by left and right springs 116 (only the left spring being shown) being anchored at their upper ends to corresponding left and right side sheets 44,46 by brackets 118 and connected at their lower ends to a transverse rod 119 which supports the undersides of plates 114. The plates 114 are tranversely spaced apart from each other so as to receive therebetween the chains 94 and the lugs 112 which project therefrom. Thus, when the rear ends of the plates 114 are in their normal elevated position, the chains 94 and lugs 112 will disappear through the spaces between the plates as they approach the discharge or rear end of the floor 78 which results in the lugs positively disengaging the roll being rotated counterclockwise, while the lower surface of the roll slideably rotates in a rearward direction with respect to the floor 78.

When a roll has been formed to a desired size in the second chamber 70, the discharge of the roll over the rear end of the floor 78 depresses the plates 114 and allows the lugs 112 of the chains 94 to again engage the lower surface of the roll up to the point at which the chains pass around and below the rear transverse tube 106. When discharge has been completed, springs 116 immediately restore the plates to their normal, rearwardly-inclined position with their rear ends in an elevated position with respect to the end of the floor 78.

The pickup unit 76, floor 78 and lower apron 80, to the extent just described heretofore, preferably are substantially the same as shown and described in U.S. Pat. No. 3,859,909, except that the floor 78 and lower apron 80 of the machine 10 have a greater length in the machine 10 in order to accommodate their arrangement as the bottom of the unique front and rear roll forming chambers 68,70 of the machine 10, such not being known heretofore, Other components and mechanisms are known heretofore which are operatively associated with the floor 78 will be described in detail later on.

The front chamber 68 in which, at various periods during the continuous operations performed by the machine 10, a core of a crop material roll is formed will be described next.

FRONT ROLL FORMING CHAMBER

Referring again to FIGS. 1 and 2, the front chamber 68 includes a front upper apron, generally designated 120, and means for movably mounting the upper apron 120 to the mobile frame 12 at a location above generally the forward half of the floor 78 and lower apron 80 which form the bottom of the front chamber 68. The mounting means includes a takeup-and-expansion mechanism, generally designated 122, for movably mounting a front portion of the front upper apron 120 to the mobile frame 12 and additional components for movably mounting rear and lower portions of the front upper apron 120 to the mobile frame 12. The mechanism 122 controls contraction (takeup) and expansion of the front upper apron 120 during roll core formation in the front chamber 68 and also controls the size of the roll core in a manner which will be described later.

The front upper apron 120, per se, preferably has a construction similar to that of the upper apron disclosed in U.S. Pat. No. 3,915,084. The apron 120 is composed of a pair of left and right endless, flexible link-type chains 124, 126, illustrated in FIGS. 1 and 2, located adjacent corresponding interior sides of the mobile frame 12, with a series of rigid bars 128 extending transversely between and connected at their opposite ends to the chains 124, 126 at longitudinally spaced intervals therealong. The bars 128 thereby extend across substantially the full width of the front chamber 68. In cross section, the bars 128 are preferably cylindrical, but may be square or any other suitable geometric shape, for purposes of offering resistance to bending of the bars, especially when engaging the periphery of a core of a roll of crop material being formed within the front chamber 68, such as illustrated in FIGS. 21 and 22.

At similar locations adjacent to, and spaced downwardly from the upper ends of, the left and right front upright beams 36, 38 of mobile frame 12 is mounted the left and right portions of the takeup-and-expansion mechanism 122. The mechanism, per se, preferably has a construction similar to that of the upper apron expanding mechanism disclosed in aforesaid U.S. Pat. No. 3,859,909. The mechanism 122 includes a transversely-extending cross tube 130 (see also FIG. 6 wherein the front upper apron 120 is omitted for purpose of clarity), the outer ends of which are rotatably supported by left and right braces 132, 134 fixed respectively to, and extending forwardly from, the corresponding left and right front upright beams 36, 38 at the aforesaid similar locations therealong. Affixed to the tube 130 at locations spaced inwardly from the braces 132, 134 are respective left and right pairs of generally opposite, radially-extending arms 136, 138 and 140, 142. At the outer ends of upper left and right arms 136, 140 of the pairs thereof are rotatably mounted corresponding upper left and right idler guide sprockets 144, 146, while at the outer ends of lower left and right arms 138, 142 are rotatably mounted corresponding lower left and right idler guide sprockets 148, 150.

An upper course, generally designated 152, of the left and right chains 124, 126 of front upper apron 120 extends over and about the upper sides of upper guide sprockets 144, 146 and therefrom to and under and about the lower sides of lower guide sprockets 148, 150.

Figure 6:
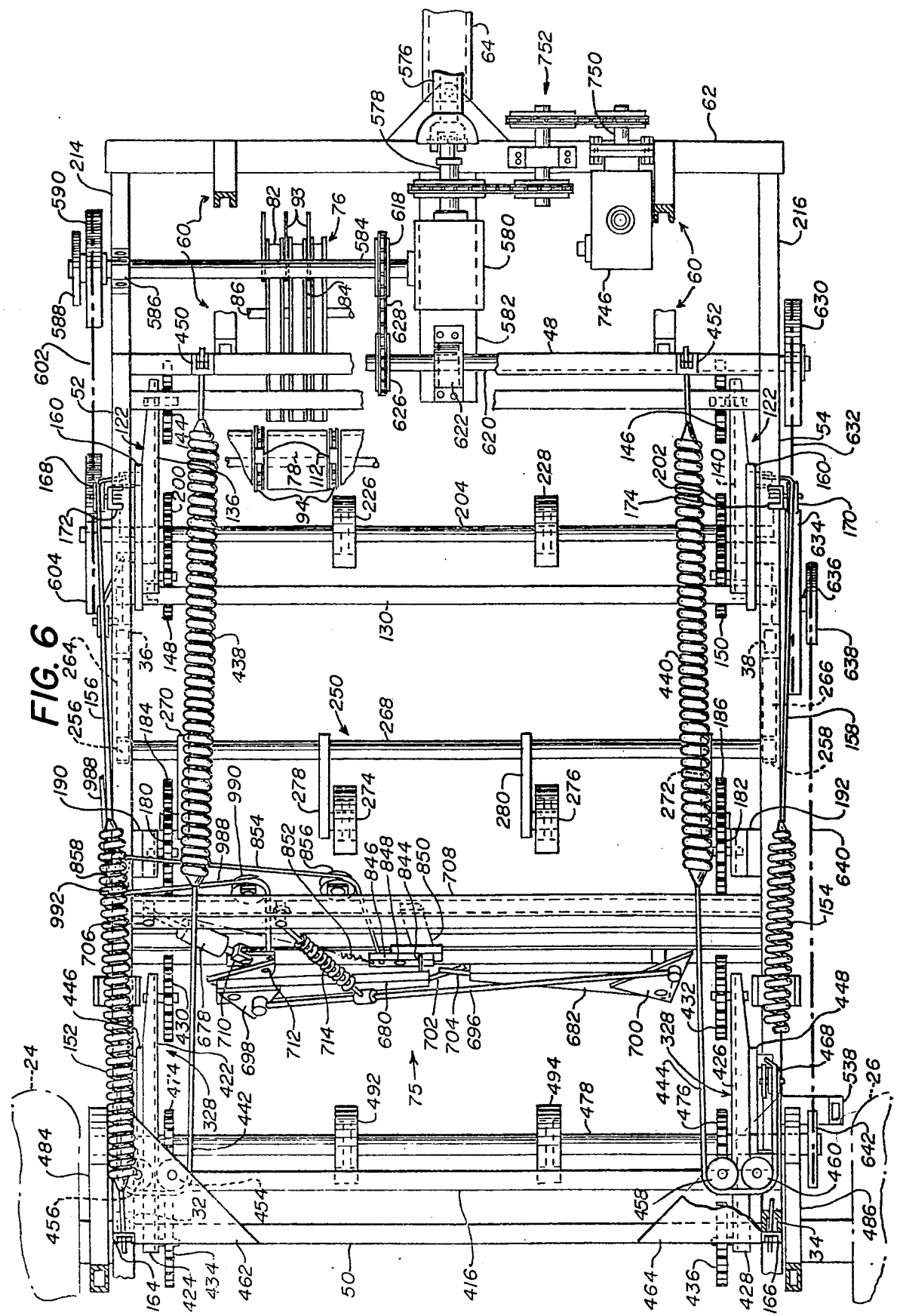
FIG. 6 is an enlarged, fragmentary, top plan view of the forward half of the machine, with the front and rear upper aprons being omitted and the floor, lower apron and pickup unit being omitted except for fragmentary portions thereof.

The pairs of arms 136, 138 and 140, 142 are normally disposed in the position seen in FIGS. 1 and 2 by tensioning means which includes left and right tension springs 152, 154, cables 156, 158 and cam plates 160, 162. The left and right springs 152, 154, more clearly seen in FIG. 6, are arranged to extend in generally longitudinal fashion adjacently along and above corresponding left and right side tube 52, 54 of the upper rectangular frame structure of mobile frame 12. The respective rear ends of the springs 152, 154 are anchored to side tubes 52, 54 of the upper rectangular frame structure by upright brackets 164, 166 fixed to respective rear ends of side tubes 52, 54. The respective front ends of the springs 152, 154 are connected to the respective ends of left and right cables 156, 158 and the cables respectively extend forwardly therefrom to, and about and over, the upper sides of front left and right pulleys 168, 170 mounted adjacently above the outer sides of left and right side tubes 52, 54 at similar locations spaced rearwardly from the forward ends thereof by upright channel brackets 172, 174. From the respective front pulleys 168, 170, the cables 156, 158 respectively extend downwardly to their opposite ends being respectively connected by left and right pins 176, 178 to the lower portions of the outer sides of corresponding left and right cam plates 160, 162. The cam plates 160, 162 are respectively fixed to cross tube 130 inwardly from its opposite ends and fixed to the outer sides of upper left and right arms 136, 140.

The upper course 152 of the left and right chains 124, 126 of front upper apron 120 extends rearwardly and upwardly from corresponding lower left and right guide sprockets 148, 150 of the takeup-and-expansion mechanism 122 to, and over and about, the upper sides of corresponding left and right upper rear idler guide sprockets 180, 182 and therefrom downwardly to, and under and about, the lower sides of corresponding left and right lower rear idler guide sprockets 184, 186 of the front chamber opening-and-closing mechanism 72 which will be described hereinafter. From the rear guide sprockets 184, 186, the upper course 152 of front upper apron 120 merges into the rear end of a lower course, generally designated 188, of the apron 120.

The upper rear sprockets 180, 182 are rotatably supported at the sides of mobile frame 12 by corresponding left and right upwardly extending brackets 190, 192 which are fixed to left and right upper middle brace structures 196, 198 which respectively interconnect corresponding left and right middle upright rails 32, 34 and front upright beams 36, 38 of the mobile frame 12.

Furthermore, the upper course 152 of the left and right chains 124, 126 of front upper apron 120 extends downwardly from corresponding upper guide sprockets 144, 146 of the takeup-and-expansion mechanism 122 to, and under and about, the lower sides of corresponding left and right driven sprockets 200, 202 and therefrom merges into the forward end of the lower course 188 of apron 120.

The driven sprockets 200, 202 for driving the front upper apron 120 are respectively fixedly mounted adjacent the opposite ends of a driven transverse shaft 204 being rotatably mounted by suitable left and right bearing structures (only right structure 206 being seen in FIG. 2) fixed on the upper sides of corresponding left and right forwardly-inclined braces 210, 212 which respectively interconnect between corresponding left and right front upright beams 36, 38 and front braces 214, 216. The braces 214, 216 are fixed at their respective lower ends to the outer ends of transverse tubular beam 62 of mobile frame 12 and respectively have rearwardly-extending upper portions 218, 220 which connect to the corresponding left and right front upright beams 36, 38. Also, front left and right side panels 222, 224 are respectively secured about their peripheries to corresponding left and right front upright beams 36, 38, forwardly-inclined support beams 56, 58, forwardly-inclined braces 210, 212 and front braces 214, 216 so as to close the side openings respectively formed by these latter interconnected structures. The side panels 222, 224, the front ends of the floor 78 and upper course of the lower apron 80, and the front end of the lower course 188 of the front upper apron 120 thereby define the inlet opening of the front chamber 68 through which crop material is delivered rearwardly from the pickup 76.

The driven transverse shaft 204 also mounts a pair of spaced annular guide hubs 226, 228 (FIG. 6) at space apart intermediate locations between the ends of shaft 204. The transverse bars 128 of the front upper apron 120 located at the area of merger between the upper course 152 and the forward end of the lower course 188 engage and are supported by the forward sides of the hubs 226, 228.

The drive arrangement for the driven shaft 204 which causes the front upper apron 120 to move in a generally clockwise direction, as seen in FIG. 1, will be described hereinafter.

Sidewalls for the front roll forming chamber 68 and for the middle portion of the machine 10 located between the chambers 68, 70 are provided by left and right side sheets 230, 232 of the mobile frame 12 which extend between and are respectively secured about their front, rear and lower peripheries to corresponding left and right longitudinal rails 14, 16, lower portions of middle upright rails 32, 34 and lower portions of front upright beams 36, 38. Respective portions of the side sheets 230, 232 adjacent the lower course 188 of the front upper apron 120 have a similar large semi-circular configuration and reach to a height somewhat greater than the diameter of the partial roll, or core, of crop material which is to be formed in the front chamber 68.

At similar locations in respective central areas of the semi-circular portions of the side sheets 230, 232 of the mobile frame 12 are defined appropriately-shaped openings 234, 236 with which are operably associated left and right auxiliary guide members 238, 240. The auxiliary guide members 238, 240, per se, preferably have a construction similar to that of the auxiliary guide members disclosed in aforesaid U.S. Pat. No. 3,859,909. The member 238, 240 are pivotally mounted at their lower ends to respective side sheets 230, 232 adjacent the lower ends of respective openings 234, 236 and both have rounded, arcuate upper surfaces 242, 244 which are respectively slideably engaged by chains 124, 126 of the lower course 188 of front upper apron 120 during the initial stages of roll formation in front chamber 68 (see FIG. 20). Normally, the guide members 238, 240 are disposed in an inner or extended position in which they extend inwardly through openings 234, 236 in the side sheets 230, 232 and into the front forming chamber 68. In such position of the members, their upper surfaces 242, 244 are spaced inwardly from the side sheets 230, 232 and in vertical alignment with the lower course 188 of chains 124, 126 of front upper apron 120.

The guide members 238, 240 are maintained in such inner positions by respective yieldable biasing means 246, 248, each of which includes a compression spring interconnecting and extending between the member and a bracket fixed to and projecting outwardly from a respective side sheet adjacent the lower end of the member.

The auxiliary guide members 238, 240 are forced from their inner or extended positions outwardly back through openings 234, 236 to outer or retracted positions upon engagement of interior, facing surfaces of the members by the opposite ends of the crop material roll being formed in the front chamber 68. The members 238, 240 also will be maintained in such retracted positions as long as the roll remains in the front chamber 68 of the machine 10. However, after discharge of the roll rearwardly to the rear chamber 70, the springs of the biasing means 246, 248 restore the members 238, 240 to their inner positions where the lower course 188 of the chains 124, 126 of the front upper apron will again be able to slideably engage the members and form the upper boundary of a generally wedged-shaped space or cavity being defined by the upper course 188 in conjunction with side sheets 230, 232, the upper course of lower apron 80 and the floor 72 which provides the initial configuration and volume of the front chamber 68 when roll forming operations are initiated therein.

The front upper apron 120, in addition to being driven along a generally clockwise, endless path as viewed in FIG. 1 and as will be explained hereinafter, is movable between contracted and expanded conditions. As shown in FIGS. 1 and 2, biasing of the takeup-and-expansion mechanism 122 provided by its springs 152, 154 tends to move and hold the front upper apron 120 in a contracted condition wherein its lower course 188 engages the auxiliary guide members 238, 240. As a roll being formed within the front chamber 68 increases in diameter, the takeup-and-expansion mechanism 122 will yieldably rotate in a counterclockwise direction and allow the front upper apron to progressively expand against the biasing, as seen in FIGS. 20 through 23, or move toward an expanded condition with the front chamber 68 progressively increasing in volume. In such manner, the increasing size of the roll is accommodated while the lower course of the front upper apron 120 is maintained in pressurized contact with a substantial circumferential portion of the crop material roll as it grows in size.

Therefore, the front roll forming chamber 68 is allowed to progressively increase in volume during the forming of a crop material roll therein. The roll forming region of chamber 68 is defined by and between approximately the front half of the crop material conveying means (i.e., of the floor 78 and upper course of the lower apron 80), the left and right side sheets 230, 232 and the lower course 188 of the front upper apron 120. The front chamber 68 is, in effect, closed during performance of roll forming operations therein, except for a crop material front inlet opening thereto formed between the front end of the lower course of the front upper apron 120 and the upper course of the lower apron 80. Once a roll core of a predetermined desired size has been formed, the front roll forming chamber 68 is opened at its rear end for discharging the roll core through its rear end to the rear roll forming chamber 70.

FRONT CHAMBER OPENING-AND-CLOSING MECHANISM

The front chamber opening-and-closing mechanism 72 is operable to open and close the rear end of the front roll forming chamber 68. The mechanism 72 includes interconnected components, generally designated 250, 252, which are respectively simultaneously operable for raising and lowering a rear portion of the front upper apron 120 and for lowering and raising a portion of the floor 78 located adjacent the rear end of the front chamber 68. The mechanism 72 further includes power means preferably in the form of left hydraulic cylinder 254 for simultaneously actuating the interconnected components 250, 252.

Referring to FIGS. 1 and 2, the front upper apron raising and lowering component 250 includes left and right swingable arms 256, 258 which are respectively pivotally mounted at their lower ends by pivot elements 260, 262 to the rear ends of corresponding left and right short beams 264, 266 respectively horizontally secured at their inner sides to left and right side sheets 230, 232 and at their forward ends to the rear sides of left and right front upright beams 36, 38 of mobile frame 12. Since the pivot elements 260, 262 are generally located co-axially with the common axis of the radii of the respective semi-circular portions of side sheets 230, 232 and the arms 256, 258, which extend along the outer surfaces of the semi-circular side sheet portions, have generally similar lengths slightly greater than the radii of the semi-circular side sheet portions, the respective outer ends of arms 256, 258 protrude slightly beyond the respective peripheral edges of the semi-circular side sheet portions. The outer ends of the arms 256, 258 are interconnected by a cross tube 268 which extends transversely across the machine 10 with its respective opposite ends extending above and outwardly past the respective peripheral edges of the semi-circular side sheet portions and being respective fixedly mounted on the outer ends of arms 256, 258. Spaced inwardly from the respective outer ends of cross tube 268 and being located inwardly from the side sheets 230, 232 are left and right brackets 270, 272 secured to the cross tube 268 and extending rearwardly therefrom when the component 250 is in the upper position illustrated in FIG. 1. Left and right lower rear guide sprockets 184, 186, briefly mentioned hereinbefore, are respectively rotatably secured to the outer ends of corresponding left and right brackets 270, 272 along the respective outer sides thereof and in vertical alignment with chains 124, 126 of the front upper apron 120. Also, a pair of lower spaced apart idler guide hubs 274, 276 (FIG. 6) are rotatably supported by respective brackets 278, 280 which also are respectively attached to and extend rearwardly from the cross tube 268 at spaced apart intermediate locations between the ends of the tube 268. The rear sides of the hubs 274, 276 engage and support the transverse bars 128 of front upper apron 120 located at the area of merger between the upper course 152 and rear end of the lower course 188 of apron 120.

Figure 4:
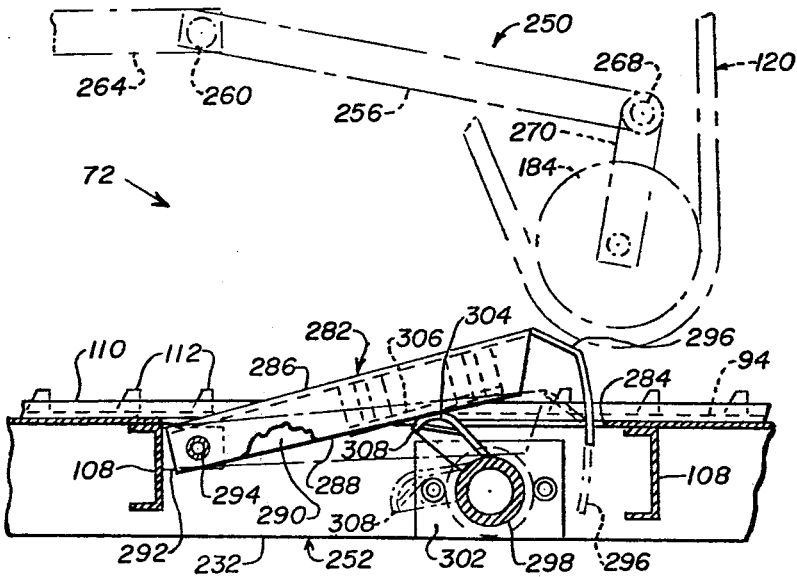
FIG. 4 is an enlarged, fragmentary side elevational view taken along line 4—4 of FIG. 3, showing one of the pivotal floor ramps of the front chamber and rotatable means to raise the ramp.

The floor portion lowering and raising component 252, as seen in FIGS. 1 and 2 and in greater detail in FIGS. 3 and 4, includes a series of side-by-side rectangular spaced apart ramps 282 disposed across the floor 78, each one aligned laterally with the next one in the series thereof and positioned between adjacent floor channels 110 within which the lower apron chains 94 are disposed. The ramps 282 are respectively mounted in a corresponding series of side-by-side spaced apart rectangular openings 284 defined in the floor 78 between adjacent floor channels 110. Two of the transverse floor supporting channel beams 108 underlie the floor 78 adjacent respective forward and rear ends of the openings 284. Each of the ramps 282 is comprised by a top planar portion 286 and left and right spaced apart vertical side portions 288, 290 which respectively depend downwardly from opposite longitudinally-extending edges of the top planar portion 286. Pairs of spaced apart, rearwardly-extending tabs 292 fixed to the rear side of front channel beam 108 and the forward ends of ramp side portions 288, 290 have aligned holes formed therein through which a transverse rod 294 extends which pivotally mounts the ramps 282 at their forward ends to the tabs 292. The transverse rod 294 at its respective opposite ends extends through and is secured to side sheets 230, 232. Also, each of the ramps 282 at its rear end includes a rearwardly and downwardly extending tail 296, the lower tip of which remains extending through the rear end of the respective opening 284 when the ramp 282 is in its raised position as seen in FIG. 4 in order to prevent crop material residue from inadvertently entering into the opening 284 and becoming lodged under the ramp 282 which would impede lowering of the ramp 282. The component 252 also includes a transverse rockshaft 298 which extends between the sides of mobile frame 12 and underlies the rear ends of floor ramps 282. The rockshaft 298 at its respective outer ends extends through and is mounted by left and right bearings 300, 302 to corresponding left and right side sheets 230, 232. A series of side-by-side spaced apart lifting fingers 304 are connected at their inner ends to the rockshaft 298 and are vertically aligned with respective contacts pads 306 fixed to the undersides of respective ones of the floor ramps 282 near the rearward ends thereof. The fingers 304 normally extend radially forwardly from the rockshaft 298 and respectively have downwardly-extending arcuate-shaped outer ends 308 which engage and lift the corresponding pads 306 to cause counterclockwise pivoting of the ramps 282 upwardly when the rockshaft 298 is rotated in a clockwise direction, as viewed in FIG. 4.

Left and right means, generally designated 310, 312, are illustrated in FIGS. 1 and 2 which interconnect the components 250, 252 such that arms 256, 258 are lowered simultaneously when floor ramps 282 are raised for closing the rear end of front chamber 68 as seen in FIGS. 20 through 23 and such that arms 256, 258 are raised simultaneously when ramps 282 are lowered for opening the rear end of front chamber 68 as also seen in FIGS. 17 through 19 and 24. The left means 310 includes an arcuate member 314 fixed to the left outer end of the rockshaft 298 so as to be rotatable therewith. The rear upper end of member 314 is pivotally connected to the lower rear end of a left turnbuckle device 316 which, in turn, is pivotally connected at its upper forward end to the rear side of the left arm 256. The right means 312 includes a short arm 318 fixed at its lower front end to the right outer end of the rockshaft 298 so as to be rotatable therewith. The upper rear end of short arm 318 is pivotally connected to the lower rear end of a right turnbuckle device 320 which, in turn, is pivotally connected at its upper forward end to the rear side of the right arm 258.

For simultaneously moving the interconnected components 250, 252, left hydraulic cylinder 254 is pivotally connected at its piston rod end to the front upper end of arcuate member 314 and is pivotally anchored at its cylinder end to the rear end of a brace 322 which is fixed to and extends along the outer surfaces of right upright beam 38 and right side panel 224. Extension of cylinder 254 causes arcuate member 314, and thereby rockshaft 298 and short arm 318, to rotate in a clockwise direction as viewed in FIG. 1, which results in fingers 304 engaging and lifting pads 306 and thereby pivoting ramps 282 upwardly and at the same time, through left and right turnbuckle devices 316, 320, pulling pivotal arms 256, 258 downwardly until the rear ends of ramps 282 are disposed closely adjacent the rear end of the lower course 188 of the front upper apron 120 which, in effect, closes the rear end of front chambers 68. Retraction of cylinder 254 causes the arcuate member 314, rockshaft 298 and short arm 318 to rotate in a counterclockwise direction, as viewed in FIG. 1, back to their respective positions as seen in FIGS. 1 and 2 which results in the ramps 282 lowering back to their horizontal positions within the plane of the floor 78 due to gravity and the arms 256, 258 being pivoted upwardly to their positions of FIGS. 1 and 2, which remotely spaces the rear end of the lower course 188 of the front upper apron 120 from the rear ends of the ramps 282 and, in effect, opens the rear end of the front chamber 68. By adjusting the turnbuckle devices 316, 320, the displacements of arms 256, 258 and thus the rear end of the front upper apron 120 at both the raised and lowered positions thereof relative to the floor ramps 282 may be adjusted.

Means for actuating the cylinder 254 will be described later on in connection with the detailed description of the hydraulic and mechanical control components which synchronize the operations performed with the machine 10.

REAR ROLL FORMING CHAMBER

Referring again to FIGS. 1 and 2, the rear chamber 70 includes an upper frame, generally designated 324, pivotally connected to and supported on the rear portion of the mobile frame 12, a rear upper apron, generally designated 326, and means for movably mounting the floor 78 and upper apron 122 to both the mobile frame 12 and the rear upper frame 120 at a location above generally the rear half of the floor 78 and lower apron 80 which form the bottom of the rear chamber 70. The mounting means include a front take-up-and-expansion mechanism, generally designated 328, for movably mounting the forward portion of the rear upper apron 326 to the mobile frame 12, a rear takeup-and-expansion mechanism, generally designated 330, for movably mounting a middle upper portion of the rear upper apron 326 to the upper frame 324 and additional components for movably mounting lower front, middle and rear portions of the rear upper apron 326 to the mobile frame 12. The takeup-and-expansion mechanisms 328, 330 control contraction (takeup) and expansion of the rear upper apron 326 during roll formation in the rear chamber 70.

The upper frame 324, per se, preferably has a construction similar to that of the upper frame disclosed in aforesaid U.S. Pat. No. 3,859,909, consisting of left and right side portions 332, 334 respectively composed of left and right straight members 336, 338, the opposite ends of which are respectively connected to the opposite ends of corresponding arcuate members 340, 342. Left and right side panels 344, 346 are respectively secured about their peripheries to corresponding left and right straight members 336, 338 and arcuate members 340, 342 so as to close the side openings respectively formed by these members. The side portions 332, 334 of the upper frame 324 are also transversely interconnected by two spaced apart cross channels 348, 350 which connect at their respective opposite ends with the arcuate members 340, 342. Further, left and right reinforcing beams 352, 354 are attached to respective side panels 344, 346 and interconnect respective straight members 336, 338 and arcuate members 340, 342 at approximate middle locations therealong.

The uppermost end of the respective side portions 332, 334 of upper frame 324 are pivotally connected by respective pivot elements 356, 358 to suitable bearing bracket structures 360, 362 mounted to respective upper ends of left and right forwardly-inclined side beams 40, 42 of the mobile frame 12. The upper frame 324 is thereby mounted to the mobile frame 12 for pivotal movement between a lower, closed position, as seen in FIGS. 1, 2 and 7 wherein left and right straight members 336, 338 of upper frame 324 rest upon corresponding left and right side beams 40, 42 of mobile frame 12, and an upper, open position, as seen in FIGS. 7 and 21. The upper frame 324 comprises part of the rear chamber opening and closing mechanism 74 which will be described later on.

Except for its greater length in the machine 10, the rear upper apron 326, per se, like front upper apron 120, preferably has a construction similar to that of the upper apron disclosed in U.S. Pat. No. 3,915,084. The apron 326 is composed of a pair of left and right endless, flexible link-type chains 364, 366, illustrated in FIGS. 1 and 2, located adjacent corresponding interior sides of the mobile and upper frames 12, 324, with a series of rigid bars 367 extending transversely between and connected at their opposite ends to the chains 364, 366 at longitudinally spaced intervals therealong. The bars 367 thereby extend across substantially the full width of the rear chamber 70. In cross section, the bars 367 are preferably cylindrical, but may be square or any other suitable geometric shape, for purposes of offering resistance to bending of the bars, especially when engaging the periphery of a roll of crop material being formed within the rear chamber 70, such as illustrated in FIGS. 18 through 20.

The rear upper apron 326 is movably supported on the mobile and upper frames 12, 324 by the above-mentioned takeup-and-expansion mechanisms 328, 330 and other additional mounting components briefly referred to above.

Positioned adjacent the respective side portions 332, 334 of upper frame 324 are left and right arcuate guide bars (not shown) which are secured to and spaced inwardly from corresponding left and right arcuate members 340, 342 by suitable brackets (not shown), such bars and brackets being substantially of the same construction as that disclosed in aforesaid U.S. Pat. No. 3,859,909. The arcuate guide bars conform generally to the profile of the arcuate members 340, 342 of upper frame 324 and the upper course, generally designated 368, of the chains 364, 366 of the upper apron 326 slideably engage and move along the respective outer edges of the arcuate guide bars as the apron 326 is moved in an overall clockwise direction, as seen in FIG. 1.

At the lower ends of the left and right side portions 332, 334 of upper frame 324 are respectively mounted left and right lower idler guide sprockets 370, 372 being respectively rotatably supported by bracket plates 374, 376 which are respectively attached to and depend forwardly and downwardly from a cross tube (not shown) extending transversely between and connected at its opposite ends to the lower ends of corresponding left and right straight members 336, 338 of upper frame 324. A pair of lower spaced apart idler guide hubs (not shown) are rotatably supported by respective clevises (not shown) which also are respectively attached to and depend forwardly and downwardly from the cross tube at spaced apart intermediate locations between the ends of the tube. The upper course 368 of the chains 364, 366 of the rear upper apron 326 extends about the lower sides of the lower guide sprockets 370, 372 and therefrom merges into the rear end of the lower course of the apron 326, such being indicated generally by 380, while the transverse bars 367 located at the area of merger between the courses 368, 380 engage the lower sides of the hubs.

Adjacent the upper ends of the left and right side portions 332, 334 of the upper frame 324 are mounted the corresponding left and right portions of the rear takeup-and-expansion mechanism 330 as well as left and right upper idler guide sprockets 382, 384, the latter being respectively rotatably supported on the interior sides of left and right bracket channels 386, 388 which are respectively connected to the upper ends of corresponding left and right arcuate members 340, 342 of upper frame 324 and extend upwardly therefrom.

The rear takeup-and-expansion mechanism 330 includes a transversely-arranged tubular shaft (not shown), the outer ends of which extend respectively through and are rotatably supported by left and right bracket plates 392, 394 positioned rearwardly of corresponding left and right bracket channels 386, 388 and connected thereto as well as to the upper ends of corresponding left and right arcuate members 340, 342 of upper frame 324. The rear takeup-and-expansion mechanism 330 further includes left and right arms 396, 398 respectively attached to corresponding left and right outer ends of transverse tubular shaft and extending in similar fashion radially therefrom normally in an upwardly and rearwardly inclined position. Left and right outer idler guide sprockets 400, 402 are rotatably mounted to the respective upper inwardly-projecting ends of corresponding left and right arms 396, 398. The rear takeup-and-expansion mechanism 330 still further includes means for biasing the arms 396, 398 to their normal inclined position, as seen in FIGS. 1 and 2, which includes left and right elongated tension springs 404, 406 respectively located outwardly along side portions 332, 334 of the upper frame 324 and left and right triangular-shaped channels 408, 410 respective secured to and depending from corresponding left and right arms 396, 398. The left and right tension springs 404, 406 are pivotally anchored at their rearward ends to respective left and right angle brackets 412, 414 fixed to, and extending outwardly from, corresponding left and right arcuate members 340, 342 of upper frame 324. The forward ends of the left and right springs 404, 406 are pivotally attached to the respective lower ends of corresponding left and right triangular-shaped channels 408, 410.

The upper course 386 of the chains 364, 366 of the rear upper apron 326 further extends about the upper sides of the upper idler guide sprockets 382, 384 as well as the outer idler guide sprockets 400, 402 of the rear takeup-and-expansion mechanism 330.

At similar locations adjacent to, and spaced downwardly from the upper ends of the left and right middle upright rails 32, 34 of mobile frame 12 is mounted the left and right portions of the front takeup-and-expansion mechanism 328 of the rear chamber 70. The latter mechanism, per se, like the takeup-and-expansion mechanism 122 of the front chamber 68, preferably has a construction similar to that of the upper apron expanding mechanism disclosed in aforesaid U.S. Pat. No. 3,859,909. The front takeup-and-expansion mechanism 328 of the rear chamber 70 includes a transversely-extending cross shaft 416 (see also FIG. 6 wherein the rear upper apron 326 has also been omitted for the sake of clarity), the outer ends of which are rotatably supported by left and right channel brackets 418, 420 fixed respectively to, and extending forwardly from, the corresponding left and right middle upright rails 32, 34 of mobile frame 12 at the aforesaid similar locations therealong. Affixed to the shaft 328 at locations spaced inwardly from the brackets 418, 420 are respective left and right pairs of generally opposite, radially-extending arms 422, 424 and 426, 428. At the outer ends of forward left and right arms 422, 428 of the pairs thereof are rotatably mounted corresponding front left and right idler guide sprockets 430, 432, while at the outer ends of rearward left and right arms 424, 428 are rotatably mounted corresponding rear left and right idler guide sprockets 434, 436.

The upper course 368 of the left and right chains 364, 366 of the rear upper apron 326 extends generally downwardly from the previously described corresponding left and right upper idler guide sprockets 382, 384 to under and about the lower sides of the corresponding left and right rear guide sprockets 434, 436 of mechanism 328 and therefrom upwardly to, and over and about, the upper sides of the corresponding left and right front guide sprockets 430, 432 of mechanism 328.

The pairs of arms 422, 424 and 426, 428 ar normally disposed in the position seen in FIGS. 1 and 2 by tensioning means which includes left and right tension springs 438, 440, cables 442, 444 and cam plates 446, 448. The left and right springs 438, 440, more clearly depicted in FIG. 6, are arranged to extend in generally longitudinal fashion adjacently along the respective inner sides of corresponding left and right side tubes 52, 54 of the upper rectangular frame structure of mobile frame 12. The respective forward ends of the springs 438, 440 are anchored to the front cross tube 48 of the upper rectangular frame structure by upright brackets 450, 452 fixed to the cross tube 48 adjacent and inwardly of its opposite ends. The respective rearward ends of the springs 438, 440 are connected to the respective ends of left and right cables 442, 444 and the cables respectively extend rearwardly therefrom and about the rear sides of left and right pairs of inner and outer pulleys 454, 456 and 458, 460 mounted below corresponding left and right corner plates 462, 464 which bridge the intersection of side tubes 52, 54 and middle cross tube 48 of the upper rectangular frame structure. From the respective outer pulleys 456, 460 of the left and right pairs of pulleys, the cables 442, 444 respectively extend forwardly and about the upper sides of left and right pulleys 466, 468 rotatably mounted adjacent and below the rear ends of corresponding left and right side tubes 52, 54 of the upper rectangular frame structure. From pulleys 466, 468, finally the cables 442, 444 respectively extend downwardly to their opposite ends being respectively connected by left and right pins 470, 472 to the lower portions of the outer sides of corresponding left and right cam plates 446, 448. The cam plates 446, 448 are respectively fixed to cross shaft 416 inwardly from its opposite ends and fixed to the outer sides of foward left and right arms 422, 426.

Furthermore, the upper course 368 of the left and right chains 364, 366 of the rear upper apron 326 extends downwardly from corresponding left and right front guide sprockets 430, 432 of the front takeup-and-expansion mechanism 328 to, and over and about, the lower sides of corresponding left and right driven sprockets 474, 476 and therefrom merges into the front end of the lower course 380 of the rear upper apron 326.

The driven sprockets 474, 476 for driving the rear upper apron 326 are respectively fixedly mounted adjacent the opposite ends of a driven cross shaft 478 being rotatably mounted to left and right mounting structures 480,482 affixed to and projecting upwardly from the respective foward ends of corresponding left and right pivotal arms 484,486. The arms 484,486 normally extend from their forward ends in a rearwardly-inclined direction to rear ends being pivotally mounted respectively at 448,490 to corresponding left and right forwardly-inclined side beams 40,42 of the mobile frame.

Means to be described later on in conjunction with the description of the rear chamber opening-and-closing mechanism 74 normally maintains the arms 484,486 in their rearward-inclined direction which disposes the driven sprockets 474,476 and shaft 478 in the lowered position, as seen in FIGS. 1 and 2.

The driven shaft 478 also mounts a pair of spaced apart annular guide hubs 492,494 (FIG. 6) at spaced apart intermediate locations between the ends of the shaft 478. The transverse bars 367 of the rear upper apron 326 located at the area of merger between the upper course 368 and the forward end of the lower course 380 engage the forward sides of the hubs 492,494.

The drive arrangement on the machine 10 for the driven shaft 478 which causes the rear upper apron 326 to move in a generally clockwise sense, as seen in FIG. 1, will be described later on.

At similar locations in respective lower, central areas of the left and right sheets 44,46 of the mobile frame 12 are defined appropriatelyshaped openings 496,498 with which are operably associated left and right auxiliary guide members 500,502. Like members 238,240 of the front chamber 68, the auxiliary guide members 500,502, per se, preferably have a construction similar to that of the auxiliary guide members disclosed in aforesaid U.S. Pat. No. 3,859,909. The members 500,502 are pivotally mounted at their lower ends to respective side sheets 44,46 adjacent the lower ends of respective openings 496,498 and both have rounded, arcuate upper surfaces 504,506 which are respectively slideably engaged by chains 364,366 of the lower course 380 of upper rear apron 326 during the initial stages of roll formation in a rear chamber 70. Normally, the guide members 500,502 are disposed in an inner or extended position in which they extend inwardly through openings 496,498 in the side sheets 44,46 and into rear forming chamber 70. In such position of the members, their upper surfaces 504,506 are spaced inwardly from the side sheets 44,46 and in vertical alignment with the lower course 380 of chains 364,366 of rear upper apron 326.

The guide members 500,502 are maintained in such inner positions by respective yieldable biasing means 508,510, each of which includes a compression spring interconnecting and extending between the member and a bracket fixed to and projecting outwardly from a respective side sheet adjacent the lower end of the member.

The auxiliary guide members 500,502 are forced from their inner or extended positions outwardly back through openings 496,498 to outer or retracted positions upon engagement of interior, facing surfaces of the members by the opposite ends of the crop material roll being formed in the rear chamber 70. The members 500,502 also will be maintained in such retracted positions as long as the roll remains in the rear chamber 70 of the machine 10. However, after discharge of the roll from the machine 10, the springs of the yieldable biasing means 508,510 restore the members 500,502 to their inner positions where the lower course 380 of the chains 364,366 of the rear upper apron 326 will again slideably engage the members and form the upper boundary of a generally wedged-shaped space as defined in conjunction with side sheets 44,46, the upper course of the lower apron 80 and the floor 78 which provides the initial configuration and volume of the rear roll forming chamber 70.

The rear upper apron 326, in addition to being driven along a generally clockwise, endless path as viewed in FIG. 1 and as will be explained later on, is movable between contracted and expanded conditions. As shown in FIGS. 1 and 2, biasing of the takeup-and-expansion members 328 and 330 provided by their respective springs 438,440 and 404,406 tends to move and hold the rear upper apron 326 in a contracted condition wherein its lower course 380 engages the auxiliary guide members 500,502. As a roll being formed within the rear chamber 70 increases in diameter, the members 328,330 will yieldably rotate respectively in counter-clockwise and clockwise directions and allow the rear upper apron 326 to progressively expand against the biasing, as seen in FIGS. 18 through 20, or move toward an expanded condition with the rear chamber 70 progressively increasing in volume. In such manner, the increasing size of the roll is accommodated while the lower course of the rear upper apron 326 is maintained in pressurized contact with a substantial circumferential portion of the crop material roll as it grows in size.

Therefore, the rear roll forming chamber 70 is allowed to progressively increase in volume during the forming of a crop material roll therein. The roll forming region of chamber 70 is defined by and between approximately the rear half of the crop material conveying means (i.e., of the floor 78 and upper course of the lower apron 80), the left and right side sheets 44,46 and the lower course of the rear upper apron 326. The rear chamber 70 is, in effect, closed during performance of roll forming operations therein, except for a crop material front inlet opening thereto formed between the front end of the lower course of the rear upper apron 326 and the upper course of the lower apron 80. Once a roll has been completely formed and then wrapped with suitable binding material, such as twine, by mechanism 75 to be described later on, the rear roll forming chamber 70 is opened at both its foward and rear ends for discharging the finished roll through its rear end and then receiving a partially formed roll, or core, of crop material through its front end from the front chamber 68.

REAR CHAMBER OPENING-AND-CLOSING MECHANISM

The rear chamber opening-and-closing mechanism 74, as seen in FIGS. 1, 2 and 7, is operable to open and close the rear end of the rear roll forming chamber 70 as well as to increase and descrease the height of the previously-described crop material inlet opening at the front end of the rear chamber 70. The mechanisms 74 includes cooperating components, generally designated 512,514, which are respectively operable for raising and lowering rear and front portions of the rear upper apron 326 in a desired predetermined sequence. The mechanism 74 further includes power means preferably in the form of left and right hydraulic cylinders 516,518 for actuating the components 512,514.

The component 512 for raising and lowering the rear portion of the rear upper apron 326 includes the previously-described pivotal upper frame 324 and various means for movably mounting that portion of the apron 326 to the upper frame 324, such as the rear takeup-and-expansion mechanism 330 and lower guide sprockets 370,372 and hubs (not shown) mounted to cross tube 378.

The component 514 for raising and lowering the front portion of the rear upper apron 326 includes aforementioned pivotal arms 484,486, driven cross shaft 478 mounted between arms 484,486 and driven sprockets 474,476 and hubs 492,494 which are mounted to the cross shaft 478.

Also, component 514 includes left and right pairs of telescoping tubes and rods 520,522 and 524,526 and left and right tension springs 528,530. These latter parts operatively interconnect the arms 484,486 with the upper frame 324 and cylinders 516,518 so as to provide for pivotal movement of the arms 484,486 in a desired predetermined sequence relative to pivotal movement of the upper frame 324. The purpose for establishing such predetermined sequence in the pivotal movement of the arms 484,486 relative to the pivotal movement of the upper frame 324 will become clear hereinafter when the control components and the overall continuous roll forming, wrapping and discharging operations of the machine 10 are described in detail.

The left and right hydraulic cylinders 516,518 are respectively anchored at their cylinder ends at 532,534 about fixed pivot points on the sides of mobile frame 12 by corresponding left lower middle brace structure 536 which interconnects left middle upright rail 32 and front upright beam 36, and corresponding right lower middle brace structure 538 which interconnects right middle upright rail 34, right front upright beam 38 and right longitudinally extending rail 16. The left and right cylinders 516,518 are respectively pivotally connected by clevises 540,542 mounted on their piston rod ends to the side portions 332,334 of upper frame 324. The left and right clevises 540,542 respectively receive therethrough corresponding left and right pivot elements 544,546 which are respectively fixed to and extend outwardly from corresponding left and right straight members 336,338 at intermediate locations therealong adjacent the forward ends of corresponding left and right reinforcing beams 352,354.

Left and right rods 522,526 have respective clevises 548,550 fixed on their forward ends which are pivotally connected to corresponding left and right brackets 552,554 fixed to respective pivotal arms 484,486 at middle locations therealong. Left and right tubes 520,524 are slideably received on the corresponding left and right rods 522,526 and are respectively pivotally mounted at their rear ends to corresponding left and right pivot elements 544,546 by respective brackets 556,558. The brackets 556,558, fixed on the rear ends of the respective tubes 520,524, extend within respective clevises 540,542 on cylinders 516,518 and pivotally receive therethrough respective pivotal elements 544,546. Left and right tension springs 528,530 are pivotally connected at their lower ends to respective brackets 560,562 fixed to respective pivotal arms 484,486 adjacent and rearwardly of the location of brackets 548,550. The upper ends of left and right springs 528,530 are respectively interconnected to corresponding left and right forwardly-inclined side beams 40,42 of mobile frame 12 by left and right adjustable fastening members 564,566.

The springs 528,530 bias the pivotal arms 484,486 toward a raised position, as shown in broken line form in FIG. 7, wherein the arms 484,486 will abut against stops 568,570 fixed to and protruding outwardly from left and right middle upright rails 32,34 of the mobile frame 12. In such raised position, the arms 484,486, via driven cross shaft 478 and driven sprockets 474,476, dispose the front end of the rear upper apron 326 at a predetermined maximum height above the floor 78 and lower apron 80 which is sufficient to allow rearward movement of the core of a partially formed crop material roll (having a diameter somewhat less than the aforementioned height of the rear upper apron front end) from the front chamber 68 through the inlet opening of the rear chamber 70.

However, when the upper frame 324 is disposed in its lowered position, as shown in solid line form in FIG. 7, due to the retracted condition of hydraulic cylinders 516,518, the pivotal arms 484,486 are maintained at a lowered position, as seen in solid line form in FIG. 7, due to abutment of the forward ends of telescoping tubes 520,524 against respective clevises 548,550 fixed on the forward ends of respective rods 522,526. When the arms 484,486 are maintained in their lowered position, the springs 528,530 are disposed in an extended or expanded state and the crop material inlet opening to the rear chamber 70 only has a height sufficient to receive a layer of crop material being conveyed rearwardly by lower apron 80, as seen in FIGS. 18 and 19.

Upon extension of hydraulic cylinders 516,518 in raising the upper frame 324, the tubes 520,524 also move rearwardly and upwardly with the piston rod ends of the cylinders 516,518 and thereby allow contraction of the springs 528,530 which results in upward pivoting of arms 484,486 toward their raised position. The arms 484,486 reach their raised position, wherein they abut stops 568,570, when the upper frame 324 has reached its partially raised position, as shown in broken line form in FIG. 7 and designated by numeral 572. Continued extension of cylinders 516,518 pivotally raises the upper frame 324 to its upper position, as shown in broken line form in FIG. 7 and designated by numeral 574, with the telescoping tubes 520,524 having slid rearwardly along the respective rods 522,526 to a remote position out of abutment therewith, as seen in broken line form in FIG. 7.

Thus, it will be readily understood that upon extension of cylinders 516,518 the front end of rear upper apron 326 will reach its raised position before the rear end thereof reaches it raised position, while upon retraction of cylinders 516,518 the front rear ends of rear upper apron 326 will reach their lowered positions simultaneously. In other words, the height dimension of the inlet opening at the front of rear chamber 70 will increase to a predetermined maximum prior to when the rear end of chamber 70 is fully opened, while it will not decrease to a predetermined minimum until the rear end of the rear chamber 70 is fully closed. When the rear end of chamber 70 is only partially closed to position 572 of the upper frame 324, shown in FIG. 7, the height dimension of the rear chamber inlet opening is still at a maximum.

Means for actuating the hydraulic cylinders 516,518 will be described later on in connection with the detailed description of the hydraulic and mechanical control components which synchronize the operations performed with the machine 10.

DRIVE MEANS

The motive power for the machine 10 is derived from a power takeoff shaft of the towing tractor. As seen in FIGS. 1, 2 and 6, machine 10 includes telescopic universal shaft 576 adapted for connection at its forward end to the pto shaft of the tractor and connected at its rear end to the input drive shaft 578 of a gearbox 580 mounted on a plate 582 fixed to and extending rearwardly from the transverse tubular beam 62 of mobile frame 12 at a middle location therealong. An output drive shaft 584 extends outwardly from the left side of the gearbox 580 to the left side of mobile frame 12 past left front brace 214. A bearing bracket 586 secured on and extending upwardly from brace 214 rotatably mounts the shaft 584 adjacent its outer end above the upper side of brace 214.

The rotary motion of gearbox output drive shaft 584 is transmitted so as to drive the pickup unit 76, lower apron 80, front upper apron 120 and rear upper apron 326.

For transmitting the rotary motion of the gearbox drive shaft 584 to the pickup unit 76, lower apron 80 and front upper apron 326, an outer drive sprocket 588 and an inner drive pulley 590 are provided being secured side-by-side on the outer end of output drive shaft 584. The outer drive sprocket 588 is interconnected to the lower apron drive shaft 98 and the pickup shaft 86 for transmitting continuous rotary motion thereto from the output shaft 584 of the gearbox 580, while the inner drive pulley 590 is interconnected to the front upper apron driven shaft 204 for transmitting rotary motion thereto.

The outer drive sprocket 588 is interconnected to the lower apron driven shaft 98 by an endless chain 592 which extends between and over outer sprocket 588 and an inner sprocket 593 secured to the left outer end of aforementioned drive shaft 98 of the lower apron 80. The chain also extends under an idler sprocket 594 rotatably mounted on a bracket 596 secured to the upper side of left forwardly-inclined support beam 56. The outer drive sprocket 588 is also interconnected to the pickup shaft 86 by another endless chain 597 which extends between and over an outer sprocket 598 secured to the left outer end of aforementioned driven shaft 98 of the lower apron 80 adjacent to inner sprocket 593 and a sprocket 600 secured to the left outer end of aforementioned pickup shaft 86.

Therefore, as viewed in FIG. 1, whenever the tractor pto is rotating, clockwise rotational motion transmitted to output drive shaft 584 is transmitted on to the lower apron driven shaft 98 which causes continuous movement of apron 80 along an endless clockwise path with its upper course moving in a rearward direction and to the pickup shaft 86 which causes continuous movement of the tines 93 along a endless clockwise path.

The inner drive pulley 590 is interconnected to the front upper apron driven shaft 204 by an endless belt 602 which extends between and over inner drive pulley 590 and front upper apron pulley 604 secured to the left end of aforementioned driven transverse shaft 204 of the front upper apron 120. However, the normal level of tension on belt 602 is insufficient to transmit the rotary motion of drive pulley 590 to front upper apron pulley 604.

For selectively increasing the tension on belt 602 to a level sufficient to cause transmission of such rotary motion to the front upper apron shaft 204, an idler pulley 606, shown in FIG. 1 but omitted in FIG. 6, is positioned above and movable into engagement with the belt 602. The idler pulley 606 is rotatably mounted to the rear end of arm 608 which is pivotally mounted at its front end on bracket 610 being fixed to the upper side of left front brace 214. A triangular tab 612 is fixed to and extends upwardly from the upper side of pivotal arm 608. A spring 614 interconnecting the tab 612 and the left side of front rack structure 60 of mobile frame 12 biases the pivotal arm 608 to an upper position, as seen in FIG. 1, wherein such position the pulley 606 does not impose a level of tension on the belt 602 sufficient to cause it to transmit the rotary motion of pulley 590 to pulley 604.

For moving pulley 606 toward the belt 602, a cable 615 is connected at one end to the upper end of tab 612 and extends therefrom rearwardly and over a guide pulley 616 rotatably mounted to the outer side of left front upright beam 36 of mobile frame 12 and therefrom through a guide spool 617 mounted on left short beam 264 of mobile frame 12 to its other end being secured to the left swingable arm 256 of the front upper apron raising and lowering component 250 at a location adjacent to, but spaced a short distance above, the pivot element 260 for the swingable arm 256. Whenever swingable arm 256 is pivoted to its lower position, the cable 615, being of sufficient length to pull the tab 612 rearwardly, causes clockwise rotation of pivotal arm 608 and thereby movement of pulley 606 toward and engagement thereof against belt 602 sufficiently to depress the upper span of belt 602 and impose the level of tension on belt 602 necessary to cause it to transmit rotary motion of drive pulley 590 to front upper apron pulley 604.

Consequently, movement of the front upper apron 120 about an endless clockwise path, as viewed in FIG. 1, only occurs when left swingable arm 256 (and also right swingable arm 258 which is interconnected thereto by cross tube 268) has been pivoted downwardly to its lowered position such as seen in FIGS. 20 through 22 or, thus, when the rear end of the front chamber 68 has been closed by the front chamber opening-and-closing mechanism 72, as previously described. Upon return pivotal movement of swingable arms 256,258 to their upper positions of FIGS. 1, 2, 17, 18 and 24, which opens the rear end of front chamber 68, the pulley 606 is moved upwardly away from belt 602 by spring 614 and, consequently, the movement of the front upper apron 120 is interrupted or terminated. Therefore, the front upper apron 120 only moves during those occasions when the front chamber rear end is closed which is entirely satisfactory since crop material roll forming operations can only occur in the front chamber 68 when its rear end is closed. At all other times, the front upper apron 120 is stationary or inoperative.

For transmitting the rotary motion of the gearbox output drive shaft 584 to the rear upper apron 70, an inner drive sprocket 618 is provided being secured on shaft 584 adjacent gearbox 580 and interconnected to the rear upper apron driven cross shaft 478 for transmitting rotary motion thereto. The drive sprocket 618 is interconnected to the rear upper apron driven cross shaft 478 by a succession of interconnected components described hereinafter.

A drive transfer shaft 620 is disposed above and rearwardly of the gearbox 580 and aligned parallel to the gearbox output drive shaft 584. The shaft 620 adjacent its inner end is rotatably mounted by bearing bracket 622 fixed on and extending above the rear end of plate 582. The shaft 620 adjacent its outer end is rotatably mounted by bearing bracket (not shown) fixed on an extending above the upper side of right front brace 216. The shaft 620 extends from adjacent the rear side of gearbox 580 transversely across the machine 10 to the right side of mobile frame 12 past right front brace 216. A drive transfer sprocket 626 is secured to the inner end of shaft 620 in alignment with drive sprocket 618 on output drive shaft 584 and the sprockets 618,626 are interconnected by a chain 628 which extends between and over them. A drive pulley 630 is attached to the outer end of drive transfer shaft 620 and a drive belt 632 extends between and over the drive pulley 630 and an inner driven pulley 634 aligned with and located rearwardly of pulley 630. The driven pulley is rotatably mounted on a stub shaft 636 fixed to and extending outwardly from right front upright beam 38 of mobile frame 12. An outer sprocket 638 is rotatably mounted on the stub shaft 636 by being secured to the hub of inner driven pulley 634. A chain 640 extends between and over the outer sprocket 638 and a driven sprocket 642 aligned therewith and secured to the right outer end of driven cross shaft 478 of the rear upper apron 326. The top span of chain 640 passes respectively over and under spaced apart idler sprocket gears 644,646 which are rotatably mounted to the opposite ends of lever arm 648.

Since the driven cross shaft 478 (and thus driven sprocket 642 mounted thereon) is movable by rear chamber opening-and-closing mechanism 74 between raised and lowered positions, as has been previously described, which changes the distance between sprockets 638,642, the lever arm 648 which rotatably mounts idler gears 644,646 is pivotally mounted at a location 649 between the gears to a bracket 650 which is fixed to and depends from right lower middle brace structure 538 and is biased toward counterclockwise rotation by a spring (not shown), which interconnects the forward end of lever arm 648 and the top end of bracket 650, in order that the gears 644,646 will move to accommodate the change in the tautness of chain 640 and maintain their biased engagement with the top span of chain 640. For example, when the cross shaft 478 is moved upwardly which moves driven sprocket 642 closer to outer sprocket 638, the spring will cause slight counterclockwise pivotal movement of lever arm 648, as viewed in FIG. 2, to maintain the gears 644,646 in biased engagement with chain 640 and to takeup any slack which is developed in the chain 640.

The aforementioned drive belt 632 which interconnects drive pulley 630 and driven pulley 634 normally would not provide a driving connection between the pulleys 630 and 634 since the normal level of tension on belt 630 is insufficient to transmit the rotary motion of pulley 630 to pulley 634.

For selectively increasing the tension on belt 632 to a level sufficient to cause transmission of such rotary motion to rear upper apron 326 via driven pulley 634, an idler pulley 654, shown in FIG. 2 but omitted in FIG. 6, is positioned above and movable into engagement with the belt 632. The idler pulley 654 is rotatably mounted to the rear end of arm 656 which is pivotally mounted at its front end on bracket 658 being fixed to and extending rearwardly and downwardly from the rear side of front rack 60. A tab 660 is fixed to and extends upwardly from the upper side of pivotal arm 656. A spring 662 interconnecting the tab 660 and the lower end of right front brace 216 biases the pivotal arm 656 toward an upper position spaced above its lower position which is illustrated in FIG. 2, wherein such upper position the pulley 654 does not impose a level of tension on the belt 632 sufficient to cause it to transmit the rotary motion of pulley 630 to pulley 634.

For holding the idler pulley 654 toward the belt 632 so as to impose sufficient tension thereon to cause transmission of such rotary motion, a cable 664 is connected at one end to the upper end of tab 660 and extends therefrom rearwardly and upwardly to its other end which is interconnected by tension spring 668 to upstanding bracket 670 fixed on the upper end of right straight member 338 of upper frame 324. When the rear chamber 70 is closed such that the upper frame 324 is disposed in its lowered position as seen in FIGS. 2 and 7, the cable 664 holds pivotal arm 656 at its lower position of FIG. 2 with idler pulley 654 engaged with and depressing the upper span of belt 632 sufficiently to impose the level of tension on belt 632 necessary to cause it to transmit rotary motion of drive pulley 630 to driven pulley 634 which, in turn, transmits rotary motion via chain 640 and sprockets 638,642 to the rear upper apron driven cross shaft 478 and causes the rear upper apron 326 to move along an endless counterclockwise path, as viewed in FIG. 2. However, when the upper frame 324 is moved to its raised position, as seen in broken line form in FIG. 7, during opening of the rear chamber 70, the bracket 670 on upper frame 324 moves forwardly allowing spring 668 to contract and to slacken such that biasing spring 662 will then cause the pivotal arm 656 to pivot to its upper position and idler pulley 654 to move upwardly away from belt 632, whereby the transmission of such rotary motion between pulleys 630 and 634 is interrupted and movement of the rear upper apron 326 ceases.

Therefore, the rear upper apron 326 only moves during those occasions when the rear end of the rear chamber 70 is closed which is entirely satisfactory since crop material roll forming operations can only occur in the rear chamber 70 when its rear end is closed.

In summary, it will be understood that the above-described drive means continuously transmits rotary motion from the rotating tractor pto shaft to the pickup unit 76 and lower apron 80 so as to drive or move the same. However, the drive means only transmits rotary motion from the rotating tractor pto shaft to the front and rear upper aprons 120,326 to move the same when the front and rear chambers 68,70 are closed by respective mechanisms 72,74.

TWINE WRAPPING MECHANISM

As briefly mentioned hereinbefore, a twine wrapping mechanism 75 is provided on the mobile frame 12 at a location generally between the front and rear chambers 68,70. A receptacle 672 is mounted on the front rack structure 60 of the mobile frame 12 which contains packages or rolls of binding material, such as twine, from which continuous strands S are routed rearwardly along the frame 12 to the wrapping mechanism 75 along any suitable paths (not shown).

As illustrated partially in FIGS. 1 and 2 and in greater detail in FIGS. 6, 8, 9 and 10, the wrapping mechanism 75 basically includes three components, namely, a twine applying means, generally designated by 674, a twine cutting means, generally designated by 676, and power means in the form of hydraulic cylinder 678 for operating the twine applying component 674.

The twine applying means 674 includes preferably two twine applying arms 680, 682 mounted respectively adjacent opposite sides of mobile frame 12. The left arm 680 at its outer end is rotatably mounted by a shaft 684 which extends between and is secured at its opposite ends to the respective inner ends of spaced apart left front and rear brackets 686, 688 being clamped to left lower middle brace structure 536. The right arm 682 at its outer end is rotatably mounted by a shaft 690 which extends between and is secured at its opposite ends to the respective inner ends of spaced apart right front and rear brackets 692, 694 being clamped to right lower middle brace structure 538.

While the use of two twine applying arms is preferred, it should be readily understood that, alternatively, one or more than two arms and any other suitable mounting arrangements therefor may be utilized for applying one or more strands of twine to the crop material roll.

The twine applying means also includes a tie rod 696 which extends transversely across the frame 12 and is pivotally secured at its opposite ends to respective plates 698, 700 being fixedly mounted to the rear sides of the respective outer ends of the arms 680, 682. The rod 696 pivotally interconnects the arms 680, 682 such that they will swing together about their respective shafts 684, 690 when moved between upper positions, as seen in solid line form in FIG. 8, and lower positions, as seen in broken line form in FIG. 8. The inner, free ends of the arms 680, 682 respectively mount tubular extensions 702, 704 which are somewhat bent so as to be laterally offset from one another to avoid engagement between them when the arms 680, 682 are moved to their upper positions during which movement the arcuate paths traversed by the outer tips of the tubular extensions 702, 704 cross each other. Strands of twine S are routed from the receptacle 672 along the sides of the frame 12 and then into the respective arms 680, 682 adjacent their outer ends, through the hollow interior of the arms and tubular extensions and out through the outer tips of the extensions, as seen in FIG. 8. Therefore, when the arms 680, 682 are moved to their lower positions, the free ends of the strands S are placed on the lower apron 80 forwardly of and adjacent to the opposite ends of a roll of crop material which has been formed in the rear chamber 70. The upper course of the lower apron 80 carries the free ends of the strands under the rotating roll along with final portions of crop material. The continuing rotation of the crop material roll moves the strands about the roll and pulls additional portions of the continuous strands from the receptacle 672, along the frame 12 and through the arms 680, 682 and extensions 702, 704. Once the roll has rotated so that the strands of twine encircle the circumferential end portions of the roll, the arms 680, 682 are moved from their lower, downwardly-depending positions back toward their upper, overlapping positions. As the arms are so moved, the tips of extensions 702, 704 sweep upwardly along opposing arcuate paths of travel which progressively bring the tips toward each other, until they cross or overlap near the top of the paths, and feed the strands from the extension tips along the bottom of the roll progressively from the opposite ends toward the center thereof. Consequently, by the time the arms reach their upper positions, strands of twine has been wrapped about the roll in a helical or spiralling fashion over the entire circumferential area of the roll.

The arms 680, 682 are moved between their upper and lower positions by hydraulic cylinder 678. The cylinder 678 is pivotally anchored at its cylinder end by pivot element 706 to the left end of a channel member 708 which extends transversely across the frame 12 above the arms 680, 682 and between left and right upper middle brace structures 196, 198 to which the member 708 is connected to its opposite ends. The lower piston rod end of cylinder 678 is pivotally secured to a bracket 710 which, in turn, is fixed on a plate 712 being secured to the front side of the outer end of left arm 680. Extension of cylinder 678 causes left arm 680 and right arm 682 threwith, via the interconnection provided by the rod 696, to pivotally move about respective shafts 684, 690 from the upper to the lower positions. Retraction of cylinder 678 pivotally returns the arms 680, 682 to their upper positions. A tension spring 714 is connected between tie rod 696 and channel member 708 so as to urge the arms 680, 682 toward their upper positions. Thus, the spring 714 will maintain the arms 680, 682 at their upper positions and thereby avoid the possibility of damage thereto if a loss of hydraulic pressure should inadvertently occur in cylinder 678 particularly at the time a partially formed roll or core of crop material is being transferred from the front chamber 68 to the rear chamber 70.

The twine cutting means 676 is operable to sever the strands S of twine adjacent and forwardly of the bottom center of the crop material roll upon being brought adjacent to each other when the tips of extensions 702, 704 near the upper ends of their arcuate paths. The means 676 includes a plate 716 extending transversely across the frame 12 and mounted in a generally forward inclination between forwardly-protruding left and right flanges 718, 720 which are attached to corresponding left and right mounting structures 480, 482 on the forward ends of left and right pivotal arms 484, 486 of the rear chamber opening-and-closing mechanism 74. At a generally central location along the forward edge of plate 716 is defined a generally semi-circular notch 722 within which the twine strands are captured when the tips of twine arm extensions 702, 704 reach their upper, overlapped positions. Also left and right surfaces 724, 726 are formed on the front edge of plate 716 on either side of the notch 722 which oppositely taper toward the notch 722 so as to insure that the twine strands, which during the wrapping operation extend downwardly from the extension tips and around and under the plate front edge and therefrom rearwardly to the crop material roll, will both be guided into the notch 722 as the tips of extensions 702, 704 reach their upper positions.

The twine cutting means 676 further includes a knife element 728 having a cutting edge. The top peripheral edge portion of the plate 716 about the notch 722 serves as a cutting edge across which the cutting edge of the knife element 728 sweeps to serve the twine strand portions which extend between the roll and the twine applying arms 680, 682. Because of the forward inclination of the plate 716 and the generally downward path of the twine strand portions between the twine arms and plate 716, it will be readily understood from FIG. 10A that the strand portions do not normally contact the upper cutting edge of the notch until the actual severing operation occurs. Therefore, wear due to friction caused by the moving twine strands occurs at the lower non-cutting edge of the notch rather than at the upper cutting edge thereof.

The knife element 728 is secured to a knife mounting plate 730 which is pivotally mounted at one end by a fastener 732 to the plate 716 rearwardly of the notch 722 and pivotally connected at its opposite end to an inner end of an actuating rod 734. The actuating rod 734 extends toward the left side of frame 12 along and above the upper surface of the transverse plate 716 through an opening in right triangular-shaped flange 720 to its outer end which rotatably mounts a cam follower or roller 736. A bracket 738 is fixed at its lower end to and extends upwardly from left side sheet 230 and includes an inwardly-protruding V-shaped cam surface 740 which overlies the roller 736. A tension spring 742, being connected at its outer end by a bracket 744 to the transverse plate 716 and at its inner end by a collar 746 to the actuating rod 734, biases the latter toward the left side of the frame 12 so as to normally maintain the roller 736 under the cam surface 740 and the knife element 728 adjacent the notch 722 and rearwardly of the guide surfaces 724, 726 so as not to obstruct the path of movement the twine strands into the notch 722.

Once the twine arms 680, 682 have reached their upper positions and the strands extend downwardly through the notch 722, the extension of hydraulic cylinders 516, 518 to actuate the rear chamber opening-and-closing mechanism 74, which as previously described involves the upward pivotal movement of arms 484, 486, also causes the elevation of the roller 736 toward and its engagement with the cam surface 740. As the roller 736 follows the lower portion of the inwardly-protruding cam surface 740, the rod 734 is moved toward the right side of the frame 12 and swings the knife element 728 across the notch 722 to sever strands of twine. Once the roller 736 passes the innermost point 744 of the cam surface 740, the spring 742 returns the rod 734 back towards the left side of the frame 12. When the arms 484, 486 are returned to their lower position by retraction of hydraulic cylinders 516, 518, the upper portion of cam surface 740 engages the roller 736 and causes rod 734 to again shift momentarily toward the right side of the frame 12. However, once the roller 736 again has passed the innermost point 744 of cam surfaces 740, spring 742 again returns the rod 734 back to its initial position.

It will be understood from the above description of the twine severing operation that the twine strands are severed at the moment that the rear chamber opening-and-closing mechanism 74 initiates opening of the rear chamber 70 for ejection of the completed and wrapped crop material roll from the rear chamber 70.

CONTROL MEANS FOR SYNCHRONIZING CONTINUOUS ROLL FORMING, WRAPPING AND DISCHARGING OPERATIONS

Referring to FIGS. 1, 2 and 6, control means for the machine 10 preferably includes a variable displacement, pressure compensated pump 746 supported on the transverse beam 62 of frame 12 which is the source of hydraulic power for causing extension and retraction of the various hydraulic cylinders of the front and rear chamber opening-and-closing mechanisms 72, 74 and the roll wrapping mechanism 75. The pump 746 may be the one commercially available from the Cessna Fluid Power Division of Cessna Aircraft Company designated by Part No. XD0422-LAB. The pump 746 is in communication with and draws fluid via line 747 (FIG. 12) from a hydraulic fluid reservoir or tank 748 which is supported on the front rack structure 60 of the frame 12 adjacent the binding material receptacle 672.

As seen in FIG. 6, an input shaft 750 of the pump 746 is interconnected to and driven by the input drive shaft 578 of the gearbox 580 via a drive train, generally designated 752. Therefore, whenever the tractor p.t.o. is rotating, the pump 746 is operating so as to be ready to cause the flow of hydraulic fluid to any of the hydraulic cylinders when demanded by the latter.

Figure 12:
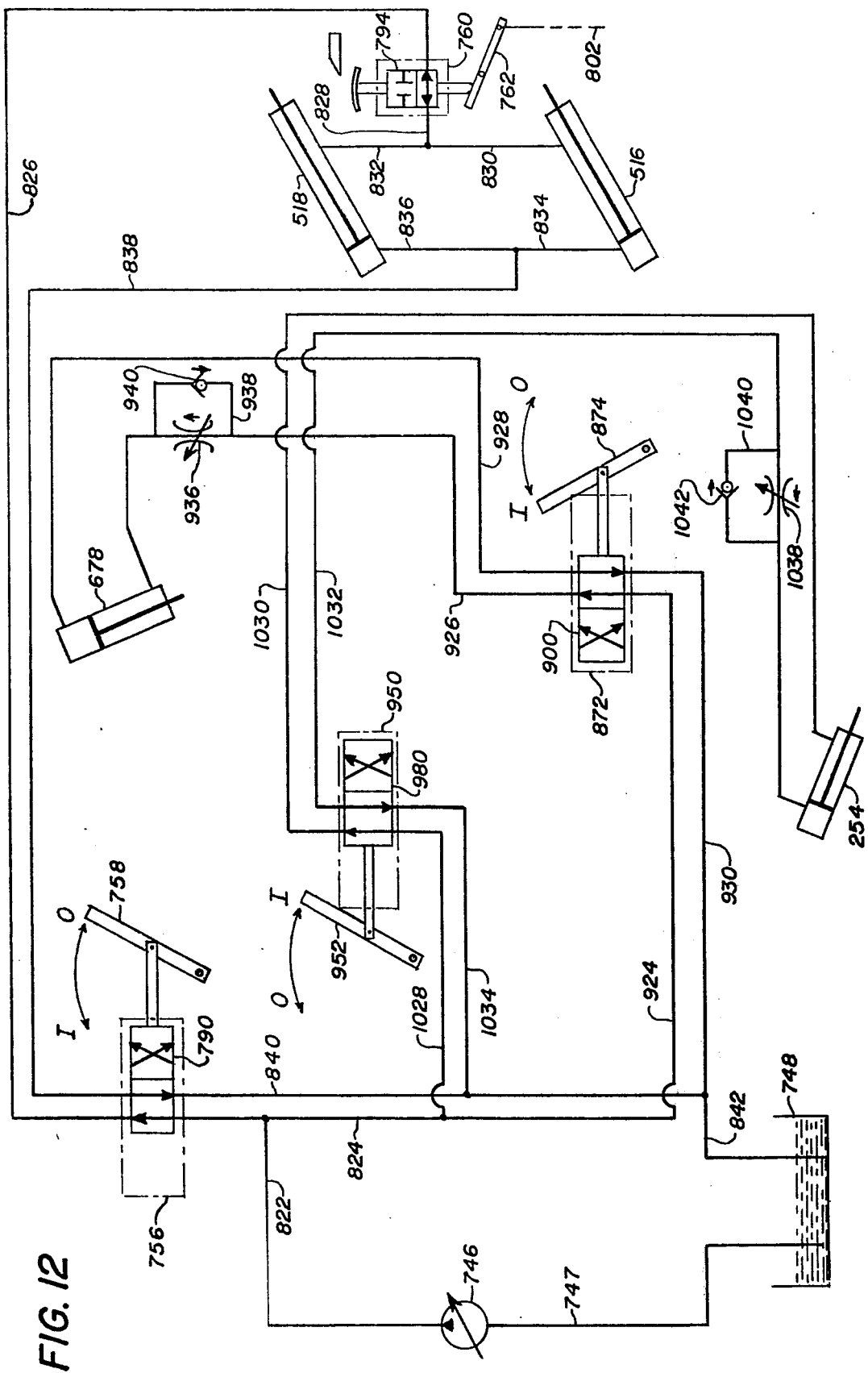
FIG. 12 is a schematic representation of the hydraulic components for controlling the operation of the front and rear chamber opening-and-closing mechanisms and the twine wrapping mechanism.

The hydraulic circuit on the machine 10 for providing fluid communication between the pump 746, the tank 748 and the cylinders 254, 516, 518 and 678 is schematically represented in FIG. 12. Also, various conventional hydraulic control valves for controlling the various flow paths between the pump, tank and cylinders are schematically illustrated in FIG. 12 and will be described hereinafter along with various mechanical control components associated therewith which are interconnected with previously-described components of the front and rear chamber opening-and-closing mechanisms 72, 74 and the twine wrapping mechanism 75 so as to synchronize the functions performed by these latter mechanisms in a manner which provides for continuous, non-stop formation, wrapping and discharge of crop material rolls by the machine 10 as it is towed across the field. Three different groups of control components will be described hereinafter.

FIRST GROUP OF CONTROL COMPONENTS

Figure 11:
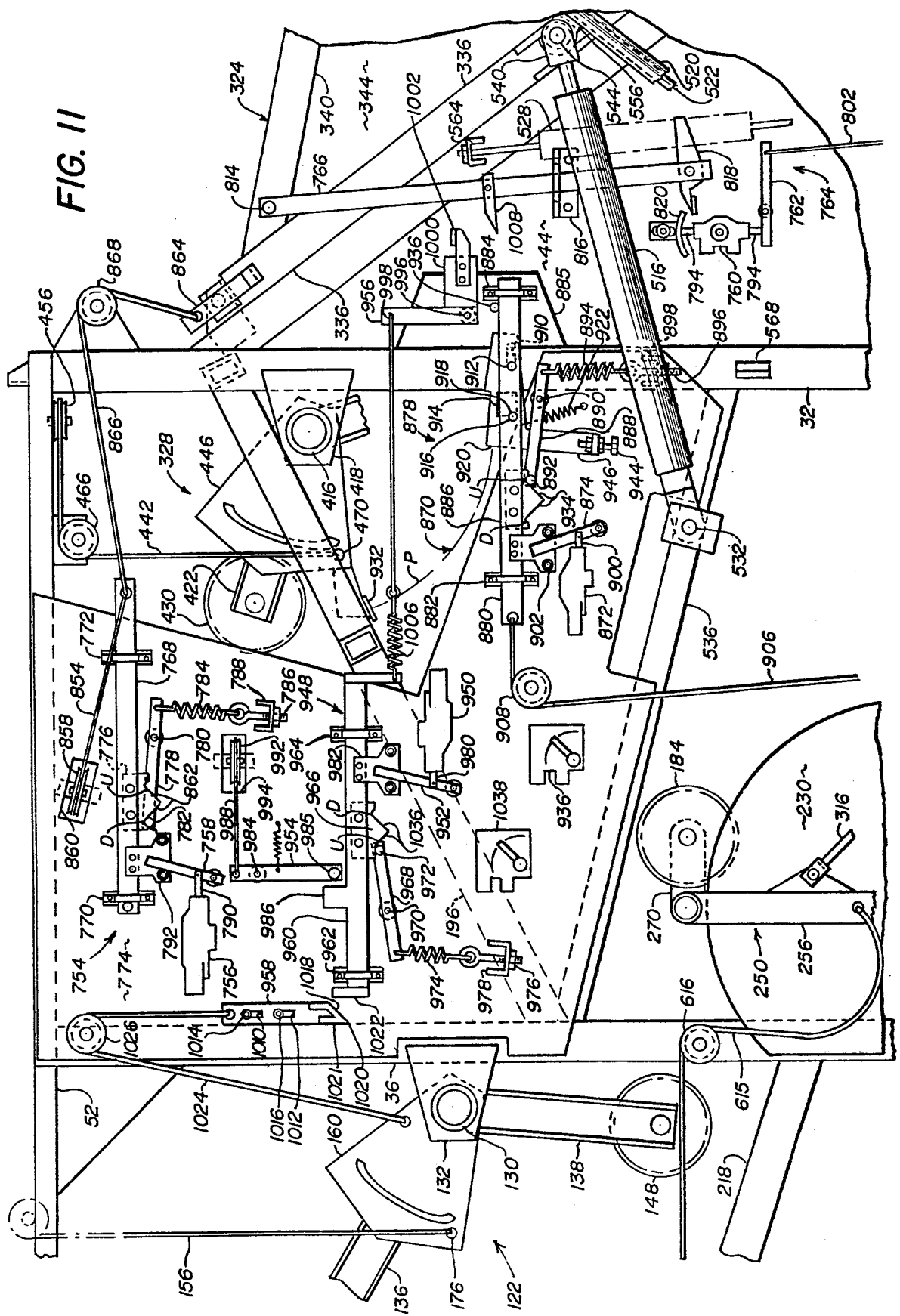
FIG. 11 is an enlarged, fragmentary, left side elevational view of an upper portion of the machine of FIG. 1, showing most of the components of three different groups of control components for synchronizing the continuous roll forming, wrapping and discharging operations performed by the machine.

Referring to FIG. 11, there is shown a first group of components which control the actuation of the rear chamber opening-and-closing mechanism 74. The first group basically includes a rear chamber slide device 754 being interconnected to upper frame 324 and wrapping mechanism 75, a primary hydraulic control valve 756 disposed adjacently below slide device 754, a valve lever 758 associated with the slide device 754 and primary valve 756, a secondary hydraulic control valve 760, a valve lever 762 associated with the secondary control valve 760, a bale trip mechanism 764 (FIG. 5) disposed in the bottom of the rear chamber 70 and interconnected with the secondary valve 762 and an actuating arm 766 connected to the upper frame 324 and associated with the secondary control valve 760.

The rear chamber slide device 754 is comprised by a bar 768 slideably mounted by spaced apart brackets 770, 772 being fixed to upper left side plate 774 which about its periphery is secured to left middle upright rail 32, left front upright beam 36, left side tube 52 and left lower middle brace structure 536. A two-position detent plate 776 is fastened to and depends from the slide bar 768. A yieldable over-centering lever 778 is pivotally mounted at 780 to left side plate 774. The lever 778 rotatably mounts a roller 782 at its forward end and is connected at its rear end to the upper end of a tension spring 784 being secured by a fastener 786 at its lower end to a bracket 788 mounted on left side plate 774. The spring 784 biases the over-centering lever 778 in a clockwise direction, as viewed in FIG. 11.

The primary hydraulic control valve 756 for the rear chamber opening-and-closing mechanism 74 is mounted to the left side plate 774 below and adjacent the forward end portion of the slide bar 768. The outer end of a spool 790 of the primary control valve 756 extends from the rear end thereof and is pivotally connected to the valve lever 758 at an intermediate location therealong spaced from its lower end at which the lever 758 is pivotally mounted to left side plate 774 and its upper end at which the lever 758 is received within a coupler 792 fastened to and depending from the forward end portion of the slide bar 768 adjacent the detent plate 776.

The secondary hydraulic control valve 760 for the rear chamber opening-and-closing mechanism 74 is mounted to rear left side panel 44 and includes a spool 794 having opposite ends which extend outwardly from the upper and lower ends of the valve 760. The secondary valve lever 762 is pivotally mounted at its middle to side panel 44 such that the forward end of the lever 762 underlies the lower end of the stationary valve spool 794.

Figure 5:
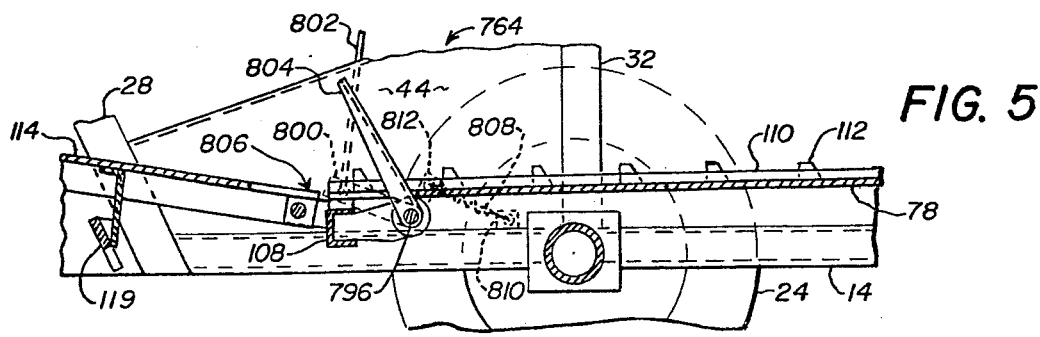
FIG. 5 is an enlarged, fragmentary side elevational view taken along line 5—5 of FIG. 3, showing the rear chamber bale trip mechanism.

The rear chamber bale trip mechanism 764 (FIG. 5) includes a shaft 796 being rotatably mounted adjacent its opposite ends respectively to left side panel 44 and a support member 798 which interconnects and extends between transverse channel beams 108 (one of which is seen in FIG. 5) which underlie the floor 78. A tab 800 is fixed to and extends radially outwardly from the rear side of shaft 796 and is interconnected at its outer end by an upwardly-extending cable 802 to the rear end of the secondary valve lever 762. The trip mechanism shaft 796 has a bale trip paddle 804 fixed thereto and radially-extending upwardly therefrom at a location intermediately between the ends of the shaft 796. A rectangular opening 806 is defined in the floor 78 and a spring 808 interconnected between a bracket 810 fixed on left rail 14 and another tab 812 fixed on shaft 796 yieldably holds the rotatably shaft 796 in an angular position in which the bale trip paddle 804 normally extends in an upward and rearward direction through the floor opening 806.

The upper end of the actuating arm 766 is pivotally mounted at 814 near the upper end of left arcuate member 340 of upper frame 324. The arm 766 extends in a downward direction through a bracket 816 (FIG. 11) fixed to left side panel 44. A lever 818 is pivotally mounted to the arm 766 above its lower end and is adapted to yieldably engage a flat plate 820 fixed on the upper end of secondary valve spool 794.

Referring to FIG. 12, the spool 790 of primary control device 756 is movable between "in" and "out" positions and is schematically represented at its "out" position. The spool 794 of secondary control valve 760 is movable between "upper" and "lower" positions and is schematically represented in its "upper" position.

When the spools 790, 794 are at their respective FIG. 12 positions, hydraulic fluid under pressure from the pump 746 communicates with the piston rod ends of left and right rear chamber opening-and-closing cylinders 516, 518 via lines 822, 824, 826 and branch lines 830, 832 so as to maintain the cylinders 516, 518 in their retracted conditions, while the cylinder ends of cylinders 516, 518 communicate with the tank 748 via branch lines 834, 836 and lines 838, 840, 842. With the cylinders 516, 518 retracted, the upper frame 324 is disposed in its lowered position and pivotal arms 484, 486 are maintained at their lowered position. The rear end of the rear chamber 70 is then closed and the crop material inlet opening to the rear chamber 70 only has a height sufficient to receive a layer of crop material being conveyed rearwardly by lower apron 80. Therefore, when the valve spools 790, 794 are in their respective "out" and "upper" positions illustrated in FIG. 12, the rear chamber 70 is either set up to initiate the continuous roll forming operations of machine 10 or has just previously received a roll core from the front chamber 68 and is now in the process of adding more crop material to the roll core to build it up to its final desired diameter.

Once the crop material roll being formed in the rear chamber 70 substantially reaches the desired maximum size, the hydraulic cylinder 678 of the wrapping mechanism 75 is extended, as caused by interaction of the front takeup-and-expansion mechanism 328 of the rear chamber 70 with a second group of control components which will be described hereinafter, whereby the two twine applying arms 680, 682 pivotally swing down to their lower positions. Once the arms 680, 682 reach their lower, side positions, they dwell there momentarily. Then, the hydraulic cylinder 678 of the wrapping mechanism 75 is retracted, as caused by interaction of the front chamber opening-and-closing mechanism 72 with the second group of control components which interaction will also be described hereinafter, whereby the twine applying arms 680, 682 begin to pivotally swing back up to their upper positions, applying strands of twine to the circumference of the roll.

As the twine applying arms 680, 682 approach their upper positions, a pin 844 protruding from the forward side of left arm 680 adjacent its outer end engages the right end of a tab 846 and causes the tab 846 to pivot in a clockwise direction, as viewed in FIG. 8, as the arm 680 and the pin 844 carried thereon move upwardly pass the tab 846. The tab 846 is pivotally mounted at its center at 848 to the lower end of a bracket 850 fixed at its upper end and depending from channel member 708. A spring 852 interconnected between the left end of the tab 846 and the front left bracket 686 returns the tab 846 to the position seen in FIG. 8 irrespective of which direction the tab 846 has been pivoted by the pin 844 (the tab 846 is pivoted counterclockwise during the downward stroke of left applying arm 680).

As seen in FIGS. 6, 8 and 11, a cable 854, which extends over pulley 856 rotatably mounted on channel member 708 and therefrom to and over another pulley 858 rotatably mounted within an opening 860 defined in left side plate 774, interconnects the left end of the pivotal tab 846 with the rear end of rear chamber slide bar 768. When the tab 846 is pivoted clockwise as viewed in FIG. 8, the portion of the cable 854 seen in FIG. 8 is pulled downwardly and the portion of the cable 854 seen in FIG. 11 is pulled forwardly, which results in slide bar 768 being moved forwardly. As slide bar 768 moves forwardly, the yieldable over-centering lever 778 pivots counterclockwise as viewed in FIG. 11, due to its roller 782 being forced to move from a left seat position, designated as D, on the detent plate 776 and follow the left side of a downwardly-projecting V-shaped cam surface 862 thereon, until the lower apex of the cam surface 862 on the detent plate 776 passes the roller 782. Once the apex of cam surface 862 has passed to the left of the over-centering lever roller 782, the force of spring 784 which biases the over-centering lever 778 in a clockwise direction, as viewed in FIG. 11, and is transmitted by roller 782 against the right side of cam surface 862, is sufficient to make the slide bar 768 keep moving forwardly until roller 782 has reached a right seat position, designated as U, on the detent plate 776 without any further assistance from the twine arm 680 through cable 854. Therefore, it will be seen that because of the provision of the over-centering lever 778 and its function to insure a consistent displacement of slide bar 768 equal to the distance between seat positions D and U each time the slide bar is moved, the displacement of the slide bar 768 provided by the pivoting of tab 846 and the resulting pull by cable 854 need only be enough to insure that the apex of the cam surface 862 of the detent plate 776 passes from the right to the left side of the over-centering roller 782.

As the slide bar 768 is moved forwardly, or to the left as viewed in FIG. 11, the primary valve lever 758, being received at its upper end within the coupler 792 on the slide bar 768, is pivoted counterclockwise from position O to position I (FIG. 12). As a result, the spool 790 of the primary control valve 756 is moved from its "out" position to its "in" position. When the primary spool 790 reaches its "in" position, and assuming the seondary spool 794 is still at its "upper" position, hydraulic fluid under pressure from pump 746 is now supplied along lines 822, 824, 838 and branch lines 834, 836 to the cylinder ends of rear chamber opening-and-closing mechanism cylinders 516, 518 (and fluid is allowed to return to the tank 748 along branch lines 830, 832 and lines 828, 826, 840, 842 from the piston rod ends of cylinders 516, 518) which causes extension thereof and pivotal movement of upper frame 324 and pivotal arms 484, 486 to their respective upper positions (see FIG. 7). As upper frame 324 approaches its upper position designated as 574 in FIG. 7, the rear end of the rear chamber 70 is sufficiently opened for the completed and wrapped roll to be discharged from the machine 10 onto the field by lower apron 80.

As upper frame 324 reaches its upper position 574, a tab 864 fixed upon and extending upwardly from the left straight member 336 of the upper frame 324 has pivoted counterclockwise, as viewed in FIG. 7 and 11. A cable 866, which extends over pulley 868 rotatably mounted to the rear side of the upper end of left middle upright rail 32, interconnects the upper end of the tab 864 and the rear end of the rear chamber slide bar 768. The cable 866 is normally somewhat slack, but as the upper frame 324 reaches its upper position, the pivotal movement of tab 864 therewith has drawn all of the slack out of cable 866 and during the last few inches of upward movement of the upper frame has pulled the portion of the cable 866 which extends between pulley 868 and the rear end of slide bar 768 in a rearward direction through a displacement sufficient to move the apex of the cam surface 862 of the slide bar detent plate 776 from the left to the right side of the over-centering lever roller 782 whereupon the above-described functioning of the over-centering lever 778 causes the slide bar 768 to keep moving rearwardly until its roller 782 reaches the left seat position D.

As the slide bar 768 is moved rearwardly, or toward its FIG. 11 position, the primary valve lever 758 is pivoted clockwise from position I back to position O of FIG. 12. As a result, the spool 790 of the primary control valve 756 is moved from its "in" position to its "out" position. When the primary spool 790 reaches its "out" position, hydraulic fluid under pressure from pump 746 is again supplied along lines 822, 824, 826, 828 and branch lines 830, 832 to the piston rod ends of rear chamber opening-and-closing mechanism cylinders 516, 518 (and fluid is allowed to return to the tank 748 along branch lines 834, 386 and lines 838, 840, 842 from the cylinder ends of cylinders 516, 518) which causes retraction thereof and pivotal movement of upper frame 324 back toward its lower position.

If the secondary spool 794 was to remain at its "upper" position, as seen in FIG. 12, the cylinders 516, 518 would retract completely and pivotally move the upper frame 324 and the arms 484, 486 to their respective lower positions. Such state of affairs would be satisfactory, if, prior to lowering of the pivotal arms 484, 486, the roll core being formed in the front chamber 68 had reached its desired predetermined size and transferred into the rear chamber 70. However, it is impossible to guarantee that the roll core in the front chamber 68 will be adequately formed in the time allotted for wrapping of the finished roll in the rear chamber 70 and the subsequent discharge of the roll from the machine 10.

Therefore, actuating arm 766 is provided for causing the spool 794 of secondary control valve 760 to move to its "lower" position and stop retraction of the rear chamber opening-and-closing mechanism cylinders 516, 518 when the downwardly-moving upper frame 324 reaches its partially closed position 572, as illustrated in broken line form in FIG. 7. It will be noted that when the upper frame 324 is at partially closed position 572, the pivotal arms 484, 486 which control the height of the front inlet opening to the rear chamber 70 are still held at their raised positions by springs 528, 530, whereby the height dimension of the rear chamber inlet opening is still at a maximum and sufficient enough to allow the movement of the core of the roll therethrough when discharged from the front chamber 68.

Specifically, as the upper frame 324 approaches its partially closed position 572, the front end of lever 818 on downwardly-moving actuating arm 766 engages the top side of flat plate 820 fixed on the upper end of the secondary valve spool 794 and pushes the spool 794 downwardly from its "upper" to its "lower" position. As seen in FIG. 12, when the spool 794 is at its "lower" position the supply of hydraulic fluid under pressure to the piston rod ends of cylinders 516, 518 is cutoff and thereby retraction of the cylinders 516, 518 ceases.

Movement of secondary spool 794 back to its "upper" position so that the cylinders 516, 518 may fully retract and the rear end of rear chamber 70 become fully closed is solely dependent upon formation of the core of a roll to the desired diameter in the front chamber 68 and then transfer of the core into the rear chamber 70. After the core enters the rear chamber 70 and moves toward the rear end thereof, it will engage and deflect or depress the bale trip paddle 804 of the rear chamber bale trip mechanism 764 which will pull downwardly on cable 802 and thereby cause secondary valve lever 762 to pivot clockwise, as viewed in FIGS. 1, 7 and 11, and push the spool 794 upwardly back to its "upper" position. Then when the cylinders 516, 518 fully retract and the upper frame 324 pivots downwardly from its position 572 to its fully closed position, it will be seen that the actuating arm 766 also moves further downwardly therewith. The lever 818 in being pivotally and yieldably mounted to the arm 766, will pivot so as to pass below the flat plate 820 on the upper end of secondary valve spool 794 without disturbing the spool's position, since the secondary valve lever 762 is holding the spool 794 at its "upper" position.

SECOND GROUP OF CONTROL COMPONENTS

Referring to FIG. 11 again, there is shown a second group of components which control the actuation of the twine wrapping mechanism 75. The second group basically includes a wrapping mechanism slide device 870 being alternately actuatable by the front takeup-and-expansion mechanism 328 of the rear chamber 70 and the front chamber opening-and-closing mechanism 72, a hydraulic control valve 872 disposed adjacently below slide device 870, a control valve lever 874 associated with the slide device 870 and control valve 872, a pivotal pedal 876 associated with the slide device 870 and the front chamber opening-and-closing mechanism 72 and a movable latch 878 associated with the slide device 870 and the front takeup-and-expansion mechanism 328 of the rear chamber 70.

The wrapping mechanism slide device 870 is comprised by a bar 880 slideably mounted by spaced apart brackets 882, 884 being fixed respectively to upper left side plate 774 and a mounting plate 885 fixed to and extending rearwardly from left middle upright rail 32. A two-position detent plate 886 is fastened to and depends from the slide bar 880. A yieldable over-centering lever 888 is pivotally mounted at 890 to left side plate 774. The lever 888 rotatably mounts a roller 892 at its forward end and is connected at its rear end to the upper end of a tension spring 894 being secured by a fastener 896 at its lower end to a bracket 898 mounted on left side plate 774. The spring 894 biases the over-centering lever 888 in a clockwise direction, as viewed in FIG. 11.

The control valve 872 for the wrapping mechanism 75 is mounted to the left side plate 774 below and adjacent the forward end portion of the slide bar 880. The outer end of a spool 900 of the valve 872 extends from the rear side thereof and is pivotally connected to the valve lever 874 at an intermediate location therealong spaced from its lower end at which the lever 874 is pivotally mounted to left side plate 774 and its upper end at which the lever 874 is received within a coupler 902 fastened to and depending from the forward end portion of the slide bar 880 adjacent the detent plate 886.

The pedal 876 is pivotally mounted at 904 to top middle edge portion of left side sheet 230 immediately forwardly of bracket 738. A cable 906 interconnects the middle portion of the pedal 876 and the forward end of the slide bar 880 and also extends over a pulley 908 rotatably mounted to left side plate 774 at a location spaced forwardly from the slide bar 880.

The movable latch 878 is disposed between a pair of interconnected, side-by-side spaced apart metal pieces which comprise the slide bar 880. The rear end portion of the latch 878 has a horizontally-extending slot 910 defined therein. A rear pin 912, fastened at its opposite ends to the two pieces of slide bar 880 and extending therebetween, extends through the latch slot 910. A large, generally square-shaped opening 914 is defined in the latch 878 at a generally middle location along the latch 878. Also, a small notch 916 is defined in the latch 878 adjacent the forward, lower corner of the square opening 914. A forward pin 918, fastened at its opposite ends to the two pieces of slide bar 880 and extending therebetween, extends through the notch 916 and supports the latch 878, as shown in FIG. 11, such that an upper, forward end portion 920 thereof extends upwardly from the top side of slide bar 880. A spring 922 interconnects the latch 878 and the left side plate 774 so as to bias the latch 878 for pivotal movement in a generally counterclockwise direction, as viewed in FIG. 11, about the rear pin 912.

Referring to FIG. 12, the spool 900 of wrapping mechanism control valve 872 is movable between "in" and "out" positions and is schematically represented at its "in" position. When the spool 900 is at its FIG. 12 position, hydraulic fluid under pressure from the pump 746 communicates with the piston rod end of wrapping mechanism hydraulic cylinder 678 via lines 822, 824, 924, 926 so as to maintain the cylinder 678 in its retracted condition, while the cylinder end of cylinder 678 communicates with the tank 748 via lines 928, 930, 842. With the cylinder 678 retracted, the twine applying arms 680, 682 are disposed in their upper positions, as seen in solid line form in FIG. 8.

As briefly mentioned above, once the crop material roll being formed in the rear chamber 70 substantially reaches the desired maximum size, the hydraulic cylinder 678 of the wrapping mechanism 75 is extended due to interaction of the front takeup-and-expansion mechanism 328, whereby the two twine applying arms 680, 682 pivotally swing down to their lower, side positions to initiate the application of twine to the roll. Actuation of the cylinder 678 is brought about as follows.

A tab 932 fixed to and extending outwardly from the left cam plate 446 of the left portion of the front takeup-and-expansion mechanism 328 of the rear chamber 70 progressively moves along a rearward and downward arcuate path P as the mechanism 328 rotates in a counterclockwise direction, as viewed in FIG. 11, as a roll being formed in the rear chamber 70 grows in diameter. As the roll nears its desired final diameter, the tab 932 engages the forward end portion 920 of the latch 878 and pushes the latch 878 rearwardly. Rearward movement of latch 878 carries the slide bar 880 with it.

As the slide bar 880 moves rearwardly, the yieldable over-centering lever 888 pivots counterclockwise as viewed in FIG. 11, due to its roller 892 being forced to move from a right seat position, designated as U, on the detent plate 886 and follow the right side of a downwardly-projecting V-shaped cam surface 934 thereon, until the lower apex of the cam surface 934 on the detent plate 886 passes the roller 892. Once the apex of cam surface 934 has passed to the right of the over-centering lever roller 892, the force of spring 894, which biases the over-centering lever 888 in a clockwise direction, as viewed in FIG. 11, and is transmitted by roller 892 against the left side of cam surface 934, is sufficient to make the slide bar 880 keep moving rearwardly until roller 892 has reached a left seat position, designated as D, without any further assistance from the tab 932 on the front takeup-and-expansion mechanism 328.

Prior to when the roller 892 reaches its left seat position D on detent plate 886, the rear end of the latch 878 engages stop pin 936, which is fixed to and extends outwardly from mounting plate 885 adjacent to rear bracket 884, and thereby ceases its rearward movement. However, because of the horizontal clearance adjacent slide bar pin 912 provided by slot 910 in latch 878 and because of the functioning of over-centering lever 888, the rearward movement of the slide bar 880 continues even though movement of latch 878 has stopped.

Once slide bar 880 has moved only slightly toward the rear and relative to the stationary latch 878, the forward pin 918 on the bar 880 moves out of small notch 916 defined in the latch 878 and into the large square opening 914. When this happens, the latch 878 pivots downwardly, due to the counterclockwise biasing force imposed thereon by spring 922, until the upper edge of the square opening 914 comes to rest on the forward pin 918. In this latter position of the latch 878, its top edge at its forward end portion 920 is at the level of the top side of the slide bar 880. Therefore, the mechanism 328 may continue to rotate counterclockwise a slight degree and the tab 932 on the mechanism 328 can continue to move therewith rearwardly for a short distance past the forward end portion 920 of the latch 878 as the final size of the roll being formed in the rear chamber 70 is reached during the time the twine arms 680, 682 are lowered.

As the slide bar 880 is moved rearwardly, or to the right as viewed in FIG. 11, the valve lever 874, being received at its upper end within the coupler 902 on the slide bar 880, is pivoted clockwise from position I to position O of FIG. 12. As a result, the spool 900 of the wrapping mechanism control valve 872 is moved from its "in" position to its "out" position. When the spool 900 reaches its "out" position, hydraulic fluid under pressure from pump 746 is now supplied along lines 822,824,924,928 to the cylinder end of the wrapping mechanism hydraulic cylinder 678 (and fluid is allowed to return to the tank 748 along lines 926,930,842 from the piston rod end of cylinder 678) which causes extension thereof and pivotal movement of the twine applying arms 680,682 to their lower, side positions, as seen in broken line form in FIG. 8.

The downward pivotal movement of the twine applying arms 680,682, due to the coupling of a third group of control components therewith which will be described hereinafter, causes extension of the hydraulic cylinder 254 of the front chamber opening-and-closing mechanism 72, whereby the front upper apron raising and lowering component 250 (comprised by swingable arms 256,258 and cross tube 268) is lowered toward the floor 78 (and the ramps 282 of the floor portion lowering and raising component 252 are simultaneously raised). As the component 250 reaches its lowered position, the left end of cross tube 265 downwardly deflects or depresses the pedal 876 which pulls the vertical portion of cable 906 downward and the horizontal portion of cable 906 forward through a displacement sufficient to move the apex of the cam surface 934 of the slide bar detent plate 886 from the right to the left side of the over-centering lever roller 892 whereupon the functioning of the over-centering lever 888 causes the slide bar 880 to keep moving forwardly until its roller 892 reaches the right seat position U.

As the slide bar 880 is moved forwardly, or toward the left in FIG. 11, the valve lever 874 is pivoted counterclockwise from position O to position I of FIG. 12. As a result, the spool 900 is moved from its "in" position, hydraulic fluid under pressure from pump 746 is again supplied along lines 822,824,924,926 to the piston rod end of wrapping cylinder 678 (and fluid is allowed to return to the tank 748 along lines 928,930,842 from the cylinder end of cylinder 678) which causes retraction thereof and pivotal movement of the twine applying arms 680,682 back toward their upper positions, as seen in solid line form in FIG. 8. Within the hydraulic fluid line 926, a one-way, variable, flow control valve 936 is interposed which may be regulated or manipulated as desired to change the speed at which the twine arms 680,682 are pivoted upwardly and thereby, depending upon whether the speed is increased or decreased, provide for less or more wraps of twine about the roll. Also, a hydraulic fluid line 938 which includes a one-way check valve 940 is interposed as a by-pass around the flow control valve 936 for allowing free flow of fluid from the piston rod end of cylinder 678 to the tank 748 during extension of the cylinder 678 and, thus, during the downward stroke of the twine arms 680,682. Since strands of twine are not being applied to the roll during the downward pivoting of the twine arms 680,682, it is desirable that the arms 680,682 reach their lower, side positions as quickly as possible so as to positively place the free ends of the twine strands on the lower apron 80 or incoming hay and to minimize the possibility of the free ends inadvertently becoming entangled or caught on adjacent structures.

As has been previously described, when the twine applying arms 680,682 approach their upper positions, the first group of control components being coupled with the left arm 680 cause extension of the rear chamber opening-and-closing mechanism cylinders 516,518 which results in severing of the twine strands by cutting means 676 and upward pivoting of the upper frame 324 which opens the rear end of the rear chamber 70 and allows the lower apron 80 to discharge the completed and wrapped roll from the machine 10 onto the field.

When the slide bar 880 was moved forwardly, or toward the left in FIG. 11, the latch 878 was still positioned with the upper edge of its square opening 914 resting on the forward pin 918 of the slide bar 880. Thus, the top edge of the forward end portion 920 of the latch 878 was still at the level of the top side of the slide bar 880. However, it will be readily understood that, before another roll is completely formed in the rear chamber 70, in some way the latch 878 must be lifted in order that the small notch 916 of the latch 878 will again receive the forward pin 918 of the bar 880, whereby the latch 878 will be reset with its forward end portion 920 extending above the slide bar 880 and within the arcuate path P of the tab 932 on the left portion of the front takeup-and-expansion mechanism 328 of the rear chamber 70.

The latch 878 is reset back to its FIG. 11 position when the component 514 for raising and lowering the front portion of the rear upper apron 326 has been raised upon extension of the rear chamber opening-and-closing mechanism cylinders 516,518. Specifically, when arms 484,486 of component 514 are pivoted and near their raised position, shown in broken line form in FIG. 7, the upper end of an upstanding tab 942 fixed on left mounting structure 480 at the forward end of the left arm 484 engages a contact element 944 adjustably secured on the lower end of a forward, downwardly-extending leg 946 of the latch 878 and lifts the latch upwardly. Once the forward pin 918 on the bar 880 becomes horizontally aligned with the small notch 916, the biasing force imposed on the latch 878 by the spring 922 is directed such that the latch 878 is moved rearwardly relative to the bar 880 through a displacement sufficient to place the notch 916 about the forward pin 918 whereby the latch is supported on the pin 918 with the forward end portion 920 of the latch 878 extending above the slide bar 880, as seen in FIG. 11. Furthermore, the spring 922 will retan the latch 878 in such position relative to the slide bar 880 until the latch and bar are again moved rearwardly and the latch contacts stop pin 936.

THIRD GROUP OF CONTROL COMPONENTS

Still referring to FIG. 11, there is shown a third group of components which control the actuation of the front chamber opening-and-closing mechanism 72. The third group basically includes a front chamber slide device 948 being alternately actuatable by the upper frame 324 of the rear chamber 70 and the wrapping mechanism 75, a hydraulic control valve 950 disposed adjacently below the slide device 948, a control valve lever 952 associated with the slide device 948 and control valve 950, a first pivotal actuator 954 associated with the slide device 948 and the wrapping mechanism 75, a second pivotal actuator 956 associated with the slide device 948 and the upper frame 324 and a slideable lock 958 associated with the slide device 948 and the takeup-and-expansion mechanism 122 of the front chamber 68.

The front chamber slide device 948 is comprised by a bar 960 slideably mounted by spaced apart brackets 962,964 being fixed to upper left side plate 774. A two-position detent plate 966 is fastened to and depends from the slide bar 960. A yieldable over-centering lever 968 is pivotally mounted at 970 to left side plate 774. The lever 968 rotatably mounts a roller 972 at its rearward end and is connected at its forward end to the upper end of a tension spring 974 being secured by a fastener 976 at its lower end to a bracket 978 mounted on left side plate 774. The spring 974 biases the overcentering 968 in a counterclockwise direction, as viewed in FIG. 11.

The control valve 950 for the front chamber opening-and-closing mechanism 72 is mounted to the left side plate 774 below and adjacent the rearward end portion of the slide bar 960. The outer end of a spool 980 of the valve 950 extends from the front side thereof and is pivotally connected to the valve lever 952 at an intermediate location therealong spaced from its lower end at which the lever 952 is pivotally mounted to left side plate 774 and its upper end at which the lever 952 is received within a coupler 982 fastened to and depending from the slide bar 960 adjacent the detent plate 966.

The first pivotal actuator 954 is pivotally mounted at 984 above the slide bar 960 and to the left side plate 774 such that a roller 985 rotatably mounted on a lower end of the actuator 954 is disposed rearwardly of and adjacent to an upstanding tab 986 fixed at an intermediate location along the slide bar 960. An upper end of the actuator 954 is interconnected by a cable 988 to the bracket 710 (FIGS. 6 and 8) which, in turn, is fixed on the plate 712 being secured to the front side of the outer end of left twine applying arm 680. The cable 988 extends upwardly from the bracket 710 over pulley 990 rotatably mounted on channel member 708 and therefrom leftwardly to and over another pulley 992 rotatably mounted within an opening 994 defined in left side plate 774 and finally forwardly to the upper end of actuator 954.

The second pivotal actuator 956 is pivotally mounted at 996 to the mounting plate 885 and includes an upwardly-extending forward portion 998 and a rearwardly-extending rear portion 1000 having an outer tip 1002. A cable 1004 is connected at one end to the upper end of forward portion 998 and extends forwardly to an opposite end which is connected to the rear end of a spring 1006. The forward end of the spring 1006 is connected to the rear end of the slide bar 960. The outer tip 1002 normally is disposed within the path of movement of a tab 1008 being fixed on the actuating arm 766 of the first group of control components, previously described.

The slideable lock 958 in the form of a flat plate is mounted in a vertically-extending position to the upper left side plate 774 just rearwardly of left front upright beam 36. The lock 958 has a pair of upper and lower spaced apart slots 1010, 1012 defined therethrough which receive respective pins 1014, 1016 fixed to the side plate 774, whereby the lock 958 may be reciprocably moved vertically toward and away from the slide bar 960.

The bottom end of the lock 958 has a rear surface 1018 which tapers to a point 1020 located at the forward side of the lock 958 and a vertical front surface 1021 adapted to engage the rear side of an upstanding shoulder 1022 formed on the forward end of the slide bar 960 when the latter is moved to its forwardmost position. In moving to such position, the front upper corner edge of the shoulder 1022 will engage the tapered rear surface 1018 of the lock 958 and force the lock to move upwardly until the rear upper corner edge of the shoulder 1022 has moved completely to the left side of the lower point 1020 and front surface 1021 on the lock 958. Once the shoulder 1022 is located on the left side of the lock's front surface 1021, the lock 958 will drop down behind the shoulder 1022. The lock 958 will now prevent the slide bar 960 from moving toward the rear, or to the right in FIG. 11. When the lock 958 is positively lifted or moved upwardly such that its point 1020 is disposed above the top edge of the shoulder 1022, the slide bar 960 is then free to move rearwardly.

The upper end of the lock 985 is interconnected to the left cam plate 160 of the left portion of the front upper apron takeup-and-expansion mechanism 122 by a cable 1024 which extends over a pulley 1026 rotatably mounted on left front upright beams 36 adjacent its upper end. It will be seen that counterclockwise rotation of mechanism 122 progressively lifts the lock 985 upwardly until finally its point 1020 is disposed above the top edge of the slide bar shoulder 1022.

Referring to FIG. 12, the spool 980 of the front chamber control valve 950 is movable between "in" and "out" positions and is schematically represented at its "in" position. When the spool 950 is at its FIG. 12 position, hydraulic fluid under pressure from the pump 746 communicates with the piston rod end of front chamber opening-and-closing mechanism cylinder 254 via lines 822,824,1028,1030 so as to maintain the cylinder 254 in its retracted condition, while the cylinder end of cylinder 254 communicates with the tank 748 via lines 1032,1034,840,842. With the cylinder 254 retracted, the front upper apron raising and lowering component 250 (swingable arms 256,258 and cross tube 268) is at its upper position as seen in FIGS. 1, 2 and 11. Also, the floor portion lowering and raising component 252 (the series of ramps 282) is at a lowered position, as seen in FIGS. 1 and 2. When components 250 and 252 of the front chamber opening-and-closing mechanism 72 are disposed at such respective positions, the rear end of the front roll forming chamber 68 is open and the layer of crop material being continuously picked up from the field by pickup unit 76 and delivered rearwardly by lower apron 80 will pass unimpeded or undisturbed through the front chamber 68 and into the rear chamber 70 of the machine 10.

Once the crop material roll being formed in the rear chamber 70 substantially reaches the desired maximum size, the hydraulic cylinder 678 of the twine wrapping mechanism 75 is caused to extend due to the interaction of the front takeup-and-expansion mechanism 328 of the rear chamber 70 with the wrapping mechanism slide device 870, as was previously described. Extension of the hydraulic cylinder 678 pivotally moves the twine applying arms 680,682 from their upper (solid line) positions of FIG. 8 to their lower, side (broken line) positions of FIG. 8.

However, downward pivotal movement of left twine applying arm 680 also pulls the portion of cable 988 illustrated in FIG. 8 in a downward direction and the portion of the cable 988 illustrated in FIG. 11 in a rearward direction which pivots first actuator 954 in a clockwise direction, as viewed in FIG. 11, and causes its roller 985 to engage upstanding tab 986 and move slide bar 960 forwardly.

As the slide bar 960 moves forwardly, the yieldable over-centering lever 968 pivots clockwise, as viewed in FIg. 11, due to its roller 972 being forced to move from a left seat position, designated as U, on the detent plate 966 and follow the left side of a downwardly-projecting V-shaped cam surface 1036 thereon, until the lower apex of the cam surface 1036 on the detent plate 966 passes the roller 972. Once the apex of the cam surface 1036 has passed to the left of the over-centering lever roller 972, the force of spring 974, which biases the over-centering lever 968 in a counterclockwise direction, as viewed in FIG. 11, and is transmitted by roller 972 against the right side of cam surface 1036, is sufficient to make the slide bar 960 keep moving forwardly until roller 972 has reached a right seat position, designated as D, on the detent plate 966 without any further assistance from the twine arm 680 through cable 988 and actuator 954.

As the slide bar 960 is moved forwardly, or to the left as viewed in FIG. 11, the lock 958 is lifted by shoulder 1022 until the latter passes to the left of lock point 1020, after which the lock 958 drops down behind or rearwardly of the shoulder 1022.

Also, as the slide bar 960 is moved forwardly, the valve lever 952, being received at its upper end within the coupler 982 on the slide bar 960, is pivoted counterclockwise from position I to position O (FIG. 12). As a result, the spool 980 of the control valve 950 is moved from its "in" position to its "out" position. When the valve spool 980 reaches its "out" position, hydraulic fluid under pressure from pump 746 is now supplied along lines 822,824,1028,1032 to the cylinder end of front chamber opening-and-closing mechanism cylinder 254 (and fluid is allowed to return to the tank 748 along lines 1030, 1034, 840, 842 from the piston rod end of cylinder 254) which causes extension thereof and downward pivotal movement of swingable arms 256,258 of front upper apron raising and lowering component 250, simultaneously with upward pivotal movement of the floor ramps 282 of component 252.

It should be mentioned at this point that within the hydraulic fluid line 1032, a one-way, variable, flow control valve 1038 is interposed which may be regulated or manipulated as desired to change the speed at which the rear end of the front upper apron is lowered by swingable arms 256,258 and thereby, depending upon whether the speed is increased or decreased, provide for less or more wraps of twine about the opposite ends of the roll. Also, a hydraulic fluid line 1040 which includes a one-way check valve 1042 is interposed as a by-pass around the flow control valve 1038 for allowing free flow of fluid from the cylinder end of cylinder 254 to the tank 748 during retraction of the cylinder 254 and, thus, during the raising of the component 250 and lowering of the component 252, or, in other words, during the opening of the rear end of the front chamber 68.

Actually, it is important that the opening of the rear end of the front chamber 68 occur as rapidly as possible so as not to obstruct movement of the roll core by the lower apron 80 toward the rear chamber. If the core is held up due to slowness in raising of component 250 after the front upper apron 120 has become inoperative, the lugs 112 of the lower apron 80 will cut grooves in the core which will inhibit sufficient traction between the core and apron 80 for positively transferring it to the rear chamber. The same importance attaches to the opening of the rear chamber 70 for discharging a completed roll onto the field. However, slowness in opening the rear end of the rear chamber not only may inhibit necessary traction between the roll and the lower apron, but also may cause the twine wrappings to be severed by the lower apron lugs 112.

Figure 13:
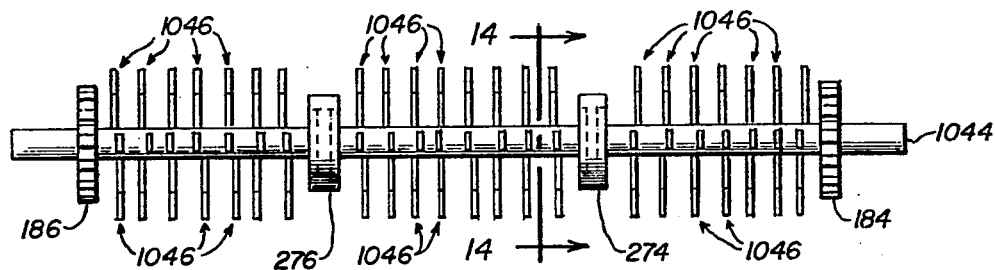
FIG. 13 is a front elevational view of the preferred form of crop material layer diverting means associated with the front chamber opening-and-closing mechanism and the rear end of the front upper apron.
Figure 14:
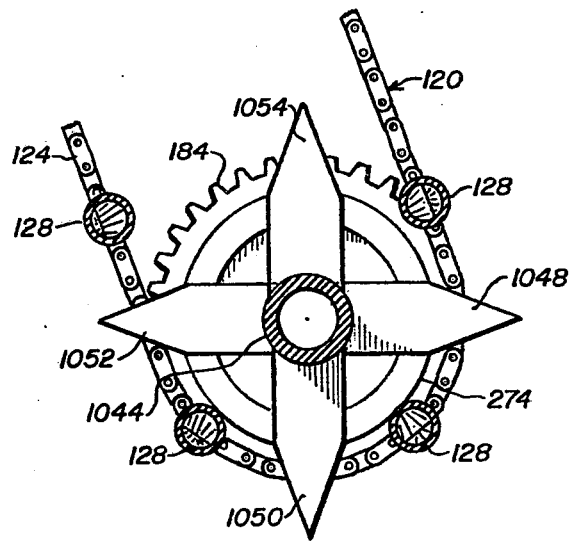
FIG. 14 is an enlarged sectional view taken along line 14—14 of FIG. 13, also showing the relationship of the teeth of the diverting means to the transverse bars of the front upper apron as the bars move around hubs on a shaft connected to the front chamber opening-and-closing mechanism.

Continuing on, therefore, when components 250 and 252 of the front chamber opening-and-closing mechanism 72 are disposed at such respective lowered and raised positions, the rear end of the front chamber 68 is, in effect, closed and the layer of crop material, being continuously picked up from the field by pickup unit 76 and delivered rearwardly by lower apron 80, will now be prevented from exiting from the front chamber 68 and will become severed or separated from the preceding portions of the layer preferably by the means shown in FIG. 13, or alternatively by the means shown in FIG. 14, both of which will be described in detail later. Also, lowering of the component 250 causes the front upper apron 120 to be driven, as previously described, and, consequently, roll forming operations begin in the front chamber 68.

Furthermore, the lowering of component 250 caused pedal 876 of the second group of control components to become depressed which, as was explained earlier, caused the wrapping mechanism valve spool 900 to be shifted to its "in" position which, in turn, caused retraction of the wrapping mechanism cylinder 678 and pivotal movement of the twine applying arms 680,682 back to their upper positions as twine is applied to and wrapped about the rotating completed roll in the rear chamber 70.

As the twine arms 680,682 reach their upper positions, the rear chamber opening-and-closing mechanism cylinders 516,518 are caused to extend, as has been explained hereinbefore, which causes the twine strands to be severed and the upper frame 324 to pivot to its upper position. As the upper frame approaches its upper position, the rear end of the rear chamber 70 becomes opened enough to allow discharge of the finished and wrapped roll by the lower apron 80. Once the upper frame 324 reaches its upper position, the rear chamber opening-and-closing mechanism cylinders 516,518 are caused to retract, as also has been explained hereinbefore, which now pivots the upper frame 324 down toward its lower position. The downward movement of the upper frame 324 and retraction of cylinders 516,518 is terminated when lever 818 on actuating arm 766, which is moving downwardly with the upper frame 324, engages and moves secondary control valve spool 794 to its "lower" position, as has been previously explained. It will be remembered that the upper frame 324 is now disposed in its partially closed position 572, as seen in broken line form in FIG. 7; however, the pivotal arms 484,486 which control the height of the front inlet opening to the rear chamber 70 are still held at their raised positions by springs 528,530, whereby the height dimension of the rear chamber inlet opening is still at a maximum and sufficient enough to allow the movement of the core of the roll therethrough when discharged from the front chamber 68.

Ordinarily, the downward pivotal movement of the upper frame 324 would cause the tab 1008 on actuating arm 766 to engage outer tip 1002 on second pivotal actuator 956 and cause clockwise pivoting thereof which, in turn, would pull the slide bar 960 rearwardly via the cable 1004 and spring 1006. The rearward movement of the slide bar 960, if unimpeded, would ultimately cause the valve spool 980 to shift to its "in" position and thereby cause retraction of front chamber opening-and-closing mechanism cylinder 254 and raising of the component 250, with simultaneous lowering of the component 252, whereby the rear end of the front chamber 68 would again be opened and the partially formed roll or core therein allowed to be moved by the lower apron 80 out of the front chamber 68 and through the enlarged inlet opening to the rear chamber 70.

However, the purpose of the slideable lock 958 is to insure that, although the rear chamber 70 may be set to receive the crop material roll core from the front chamber 68, transfer of the roll core will not be allowed to occur until the size of the core being formed in the front chamber 68 has reached a desired predetermined diameter. Preferably, the diameter selected for the core will fall within the range of 36 to 48 inches. A core having a diameter within the aforementioned range tends to hold together and maintain its transverse alignment to the machine 10 during the transfer of the core from the front to the rear chamber by the lower apron 80. Therefore, continuous roll forming and discharging operations may be more consistently performed with the machine 10 when cores of rolls successively formed in the front chamber ultimately have a final diameter falling within the aforementioned range before each core is allowed to be transferred to the rear chamber where the roll forming operation will be continued until completion.

The slide bar 960 will be pulled rearwardly via the cable 1004 and spring 1006 until the rear side of the shoulder 1022 engages the front surface 1021 of lock 958. However, the slide bar 960 will have moved rearwardly, before being stopped by lock 958, through a displacement sufficient to move the apex of the cam surface 1036 on the detent plate 966 from the left side to just slightly past the right side of the over-centering lever roller 972 (see FIG. 20). Therefore, although the roller 972 has moved from its right seat position D on the detent plate 966, it has not yet reached the left seat position U. Since the roller 972 is now disposed on the left side of the downwardly-projecting V-shaped cam surface 1036, when the lock 958 is lifted to release the slide bar 960, the force of spring 974, which biases the over-centering lever 968 in a counterclockwise direction, as viewed in FIG. 11, and is transmitted by roller 972 against the left side of cam surface 1036, is sufficient to make the slide bar 960 move further rearwardly until roller 972 has reached the left seat position U on the detent plate 966 without any further assistance from second actuator 956, cable 1004 and spring 1006. Since, the lock 958 is lifted progressively as the takeup-and-expansion mechanism 122 of the front chamber 68 rotates counterclockwise, as viewed in FIG. 11, and, further, since the degree of angular rotational displacement of the mechanism 122 is directly related to the diameter size of the core formed in the front chamber 68, it is readily apparent that by selection of an appropriate length for the cable 1024 the desired final diameter for the roll core may be selected.

As the slide bar 960 is further moved rearwardly, or to the right as viewed in FIG. 11, the valve lever 952 is pivoted clockwise to position I of FIG. 12. As a result, the spool 980 of the control valve 950 is moved to its "in" position. When the valve spool 980 reaches its "in" position, hydraulic fluid under pressure from pump 746 is now supplied along lines 822, 824, 1028, 1030 to the piston rod end of front chamber opening-and-closing mechanism cylinder 254 (and fluid is allowed to return to the tank 748 along lines 1032, 1040, 1034, 840, 842 from the cylinder end of cylinder 254) which causes retraction thereof and upward pivotal movement of swingable arms 256, 258 of front upper apron raising and lowering component 250, simultaneously with downward pivotal movement of the floor ramps 282 of component 252.

When components 250 and 252 of the front chamber opening-and-closing mechanism 72 are disposed at such respective raised and lowered positions, the rear end of the front chamber 68 is sufficiently opened to allow transfer of the roll core by the lower apron 80 from the front chamber 68 through the enlarged inlet opening of the rear chamber 70. As was previously described, once the core approaches the rear end of the rear chamber 70, the bale trip paddle 804 is depressed by the roll core and instantaneously the cylinders 516, 518 are completely retracted and simultaneously close the rear end of the rear chamber (by lowering the upper frame 324 from its partially closed to its closed position) and reduce the height dimension of the rear chamber inlet opening from its maximum to its minimum (by lowering arms 484, 486 from their raised to their lowered position). Closing of the rear chamber 70 drapes the rear upper apron 326 over the roll core and causes the rear upper apron 326 to be driven, as previously described, whereby roll forming operations begin in the rear chamber 70.

CROP MATERIAL LAYER DIVERTING MEANS

When the components 250 and 252 of the front chamber opening-and-closing mechanism 72 are respectively lowered and raised to close the rear end of the front chamber 68 and initiate formation of a roll core in the front chamber 68, in certain crop materials or conditions some difficulty has been experienced in segregating or cutting-off the incoming crop material windrow or layer from that which preceded it and has already passed through the front chamber. In other words, in certain crop materials or conditions, the mere lowering of the rear end of the front upper apron 120 and raising of the floor ramps 282 to close the rear end of the front chamber 68 are not sufficient to positively divert the incoming crop material from a rearward path and into an upwardly and forwardly path so as to initiate formation of the roll core.

Figure 16:
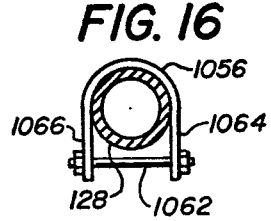
FIG. 16 is an enlarged sectional view taken along line 16—16 of FIG. 15.
Figure 15:
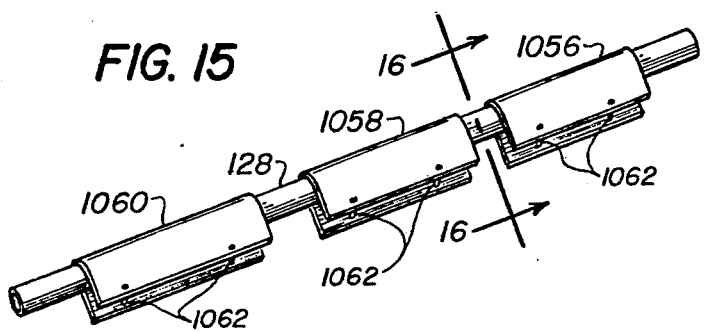
FIG. 15 is a perspective view of an alternative form of crop material layer diverting means attached to approximately every third one of the transverse bars of the front upper apron.

The preferred means which may be incorporated into the machine 10 for positively diverting the incoming crop material for starting a roll core in the front chamber 68 is illustrated in FIGS. 13 and 14. An alternative form of diverting means which may be incorporated into the machine, but which is less satisfactory than the preferred means in lighter crop materials, is shown in FIGS. 15 and 16.

Referring to FIGS. 13 and 14, there is illustrated a tube 1044 which when provided in the machine 10 also becomes part of the front upper apron raising and lowering component 250. The tube 1044 has fixedly mounted adjacent its opposite ends the respective left and right lower rear guide sprockets 184, 186, previously described as being respectively rotatably secured to the outer ends of brackets 270, 272 (see FIG. 6). Now, the opposite ends of the tube 1044, when it is provided in the machine 10, would be rotatably mounted to respective outer ends of brackets 270, 272. Also, the tube 1044 has fixedly mounted thereto the pair of spaced apart annular guide hubs 274, 276 at spaced apart intermediate locations between the ends of the tube 1044. The hubs 274, 276 were previously described as being respectively rotatably secured to the outer ends of respective brackets 278, 280 (FIG. 6). Now, the tube 1044 would also be rotatably mounted to respective outer ends of brackets 278,280.

The preferred diverting means takes the form of groups 1046 of four teeth being spaced apart one group from the next axially along the tube 1044. In each group, the four teeth, 1048, 1050, 1052, 1054 are respectively mounted at their inner ends to the tube 104 at circumferentially spaced and slightly axially offset locations about and along the tube 1044. The teeth each radially extend outwardly from the tube 1044 to a tapered outer end which extends past the sprockets 184,186 and terminates at a point.

Accordingly, crop material being delivered along a rearward path by lower apron 80 toward the closed rear end of the front chamber 68 will be aggressively engaged by the clockwise rotating groups of fingers (as viewed in FIG. 14) and caused to take an upward and forward path, thereby segregating or severing the material from the preceding material. The transverse bars 128 of the front upper apron 120, after moving around the hubs 274,276, move along an upward path which crosses the circular path traversed by the pointed tips of the rotating groups of severing fingers, 1048, 1050, 1052 1054 whereby the bars 128 will naturally perform the function of stripping crop material from the fingers once the fingers have aggressively change the direction of movement of the crop material.

Referring to FIGS. 15 and 16, there is illustrated the alternative diverting means which takes the form of a series of three U-shaped channels 1056, 1058, 1060 being clamped by fasteners 1002 about approximately every third one of the transverse bars 128 of the front upper apron 120 at spaced apart locations axially along the bar 128. As the front upper apron 120 moves in a clockwise direction, as viewed as FIG. 1, and individual bars pass about lower rear hubs 274,276, the opposite leg portions 1064,1066 of each channel extend radially outwardly from the hubs to longitudinal edges which will aggressively engage the crop material, cause it to become severed from the preceding material and turn it into an upward and forward direction.

CONTINUOUS ROLL FORMING, WRAPPING AND DISCHARGING OPERATIONS

FIGS. 1, 2 and 11 illustrate the machine 10 set up for the commencement of roll forming operation in the rear chamber 70 of the machine.

As seen in FIG. 11, in the first group of control components, the over-centering lever roller 782 is disposed at the left seat position D on the detent plate 776 of the rear chamber slide bar 768 and thereby the rear chamber primary control valve spool 790 is at its "out" position. The components 512,514 of the rear chamber opening-and-closing mechanism 74 are at their lowered positions due to the primary valve spool 790 being at it "out" position and, particularly, due to the rear chamber secondary control valve spool 794 having been manually moved by the machine operator to its "upper" position. This is the only instance (i.e., at the commencement of operations when machine 10 is empty) where the movement of any component of the machine has to be done manually by the operator, that is, other than manual actuation and de-actuation of the tractor pto shaft by the operator.

In the second group of components, the over-centering lever roller 892 is disposed at the right seat position U on the detent plate 886 of the wrapping mechanism slide bar 880 and thereby the wrapping mechanism control valve spool 900 is at its "in" position. The twine applying arms 680,682 of wrapping mechanism 75 are disposed at their upper positions due to the control valve spool 900 being at its "in" position.

In the third group of control components, the over-centering lever roller 972 is disposed at the left seat position U on the detent plate 966 of the front chamber slide bar 960 and thereby the front chamber control valve spool 980 is at its "in" position. The components 250,252 of the front chamber opening-and-closing mechanism 72 are disposed at their respective raised and lowered positions such that the front upper apron 120 is stationary and the rear end of the front chamber 68 is open.

FIGS. 17 through 24 schematically illustrate the successive stages of the operations performed by the machine 10, as it is moved across the field, in continuously picking up crop material, such as windrowed hay or the like, from the field and then forming, wrapping and discharging large rolls or round bales of the crop material. FIGS. 17A through 24A schematically illustrate the relative positions of some of the control components in the three, previously-described groups thereof at the various stages of the operations performed by the machine 10 correspondingly depicted in FIGS. 17 through 24.

In FIG. 17, the machine is set up the same as shown in FIG. 1 for rear chamber roll forming operation, with the control components shown in FIG. 17A being set up the same as depicted in FIG. 11. As illustrated, the machine 10 is being towed across the field by a tractor (not shown) with the tractor pto in operation. With the pto rotating, the pickup unit 76 is continuously picking up windrowed crop material from the field and delivering it rearwardly to the front end of the floor 78 and the upper course of the lower apron 80. The apron 80 is moving the crop material rearwardly through the open front chamber 68 and into the rear chamber 70 toward the closed rear end of the latter. In the rear chamber 70, the upper course of the lower apron 80 and the lower course of the rear upper apron 326 are moving in opposite directions and thereby are rolling the incoming crop material in a counterclockwise direction into a roll. The roll has formed to a diameter size sufficiently large enough to engage and cause the auxiliary guide members 500,502 (not shown in FIG. 17) for the rear upper apron 326 of the rear chamber 70 to pivot outwardly.

The above-described rear chamber roll forming operation continues and the relative positions of the machine components remain the same as seen in FIGS. 17 and 17A, until the roll of crop material approaches its desired maximum diameter size, as illustrated in FIG. 18.

In FIG. 18, the crop material roll being formed in the rear chamber 70 has about reached its desired final size. In doing so, the roll has caused counterclockwise rotation of the front takeup-and-expansion mechanism 328 of the rear chamber (in yielding to expansion of the rear upper apron 326) to the point where its tab 932 has engaged and moved latch 878 and therewith wrapping mechanism slide bar 880 rearwardly sufficiently enough to cause the over-centering lever roller 892 to change from its right seat position U, shown in FIG. 17A, to its left seat position D, shown in FIG. 18A, on the detent plate 886 of the wrapping mechanism slide bar 880. Such movement of the slide bar 880 causes the wrapping mechanism control valve spool 900 to move from its "in" to its "out" position. Movement of the spool 900 to its "out" position causes extension of the wrapping mechanism hydraulic cylinder 678 and thereby movement of the twine applying arms 680,682 from their upper, overlapped positions toward their lower, side positions.

FIG. 19 shows the twine applying arms 680,682 reaching their lower, side positions which initiates closing of the rear end of the front chamber 68.

Specifically, closing of the front chamber rear end occurs as follows. As the left twine applying arm 680 pivotally moves downwardly and approaches its lower position, it pulls cable 988 downwardly which via the first actuator 954 moves the front chamber slide bar 960 forwardly sufficiently enough to cause the over-centering lever roller 972 to change from its left seat position U, shown in FIG. 18A, to its right seat position D, shown in FIG. 19A, on the detent plate 966 of the front chamber slide bar 960. Such movement of the slide bar 960 causes the front chamber control valve spool 980 to move from its "in" to its "out" position. Movement of the spool 980 to its "out" position causes extension of the front chamber opening-and-closing mechanism cylinder 254. As the cylinder 254 extends, the swingable arms 256,258 of the front chamber opening-and-closing mechanism component 250 pivotally move downwardly while the floor ramps 282 of the component 252 pivotally move upwardly, to close the rear end of the front chamber 68.

However, the twine applying arms 680,682 reach their lower positions before the front chamber opening-and-closing mechanism 72 has closed the rear end of the front chamber 68. When the arms 680,682 have reached their lower positions, the free ends of the twine strands are placed on the lower apron 80 forwardly of and adjacent to the opposite ends of the roll formed in the rear chamber 70. The upper course of the lower apron 80 carries the free ends of the strands under the rotating roll along with final portions of the crop material which were moved through the front chamber before the rear end of the latter was fully closed. The continuing rotation of the rear chamber roll by the rear upper apron 326 and the lower apron 80 moves the strands about the roll and pulls additional portions of the continuous strands through the arms 680,682.

About the time the roll has completely rotated one or so times so that the strands of twine encircle the circumferential end portions of the roll about one or so times, the components 250,252 of the front chamber opening-and-closing mechanism 72 reach their respective positions which close the rear end of the front chamber 68.

FIG. 20 shows the components 250,252 of the front chamber opening-and-closing mechanism 72 at their respective lowered and raised positions which causes clockwise movement of the front upper apron 120, engagement of the lower course of the front upper apron 120 with the auxiliary guide members 238,240 of the front chamber 68 to define the inital roll forming area of the front chamber 68 with the lower apron 80, and severance of the incoming crop material at the rear end of the front chamber from the preceding portions of crop material which had just passed through the front chamber rear end before it was fully closed. Therefore, the formation of a partial roll or core of crop material is initiated in the front chamber between the rearwardly-moving upper course of the lower apron 80 and the forwardly-moving lower course of the front upper apron 120.

Also, when the component 250 of the front chamber opening-and-closing mechanism 72 reaches its lowered position, the twine applying arms 680,682 are caused to pivotally move from their lower, side positions back up toward their upper, overlapped positions.

Specifically, the return of the twine applying arms 680,682 to their upper positions occurs as follows. The left end of cross tube 265 of front chamber opening-and-closing mechanism component 250 depresses pedal 876 which pulls downwardly on cable 906 and moves wrapping mechanism slide device 870 forwardly sufficiently enough to cause the over-centering lever roller 892 to change from its left seat position D, shown in FIG. 19A, to its right seat position U, shown in FIG. 20A, on the detent plate 886 of the wrapping mechanim slide bar 880. Such movement of the slide bar 880 causes the wrapping mechanism control valve spool 900 to move from its "out" to its "in" position. Movement of the spool 900 to its "out" position causes retraction of the wrapping mechanism hydraulic cylinder 678 and thereby movement of the twine applying arms 680,682 from their lower, side positions, as shown in dotted line form in FIG. 20, toward their upper, overlapped positions, as illustrated in solid line form in FIG. 20.

As the twine applying arms 680,682 move upwardly, the tips of arm exensions 702,704 (FIG. 8) sweep upwardly along opposite arcuate paths of travel which progressively bring the tips toward each other, until they cross or overlap near the top of the paths, and feed the strands from the extension tips downwardly and along the bottom of the rotating rear chamber roll progressively from its opposite ends toward its center. Consequently, by the time the arms 680,682 reach their upper positions, strands of twine have been wrapped about the roll in a helical or spiralling fashion over the entire circumferential area of the roll and the remaning portions of the strands extending between the roll and the extension tips of the twine applying arms are centrally-located and extend downwardly through the notch 722 of the twine cutting means 676.

FIG. 20 also shows the components 512,514 of the rear chamber opening-and-closing mechanism 74 being actuated to open the rear end of the rear chamber 70 and to increase the height dimension of the front inlet opening of the rear chamber 70 to its predetermined maximum, when the twine applying arms 680,682 reach their upper positions.

Specifically, actuation of the rear chamber opening-and-closing mechanism 74 occurs as follows. As the left twine applying arm 680 pivotally moves upwardly and approaches its upper position, the pin 844 on the twine arm engages and pivotally moves the tab 846 in a clockwise direction which pulls cable 854 downwardly and thereby moves the rear chamber slide bar 768 forwardly sufficiently enough to cause the over-centering lever roller 782 to change from its left seat position D, shown in FIG. 19A, to its right seat position U, shown in FIG. 20A, on the detent plate 776 of the rear chamber slide bar 768. Such movement of the slide bar 768 causes the rear chamber control valve spool 790 to move from its "out" position to its "in" position. Movement of the spool 790 to its "in" position causes extension of the rear chamber opening-and-closing mechanism cylinders 516,518. As the cylinders 516,518 extend, the upper frame 324 and pivotal arms 484,486 pivotally move upwardly from their respective positions of FIG. 20 to their respective positions of FIG. 21. As the pivotal arms 484,486 pivotally move upwardly from their lower positions, the twine strands extending through notch 722 of the twine cutting means 676 are severed by the knife element 728.

As the upper frame 324 approaches its upper position, designated as 574 in FIG. 7, the clockwise movement of the rear upper apron 326 terminates and the rear end of the rear chamber 70 is sufficiently opened for the completed and twine wrapped roll to be discharged from the machine 10 onto the field by the lower apron 80 (as shown in phantom outline in FIG. 21). The pivotal arms 484,486 had already reached their upper positions which increased the height dimension of the rear chamber to a maximum large enough to allow the transfer of the roll core therethrough when discharged from the front chamber 68, as seen in phantom in FIG. 23.

FIG. 21 shows a roll core having formed in the closed front chamber 68 to a diameter size sufficiently large enough to engage and cause the auxiliary guide members 238,240 (not shown in FIG. 21) for the front upper apron 120 of the front chamber 68 to pivot outwardly. However, the roll core has not yet reached its desired maximum diameter size at which it would then be ready for transfer to the rear chamber 70.

FIG. 21 also shows the upper frame 324 of the rear chamber 70 having reached its uppermost position and just starting on its pivotal return movement back down toward its lower position.

Specifically, changing the direction of pivotal movement of the upper frame 324 occurs as follows. As the upper frame 324 reaches its upper position, the tab 864 fixed thereon has pivoted counterclockwise sufficiently enough to pull cable 866 rearwardly which moves the rear chamber slide bar 768 rearwardly sufficiently enough to cause the over-centering lever roll 782 to change from its right seat position U, shown in FIG. 20A, to its left seat position D, shown in FIG. 21A, on the detent plate 776 of the rear chamber slide bar 768. Such movement of the slide bar 768 causes the rear chamber primary control valve spool 790 to move from its "in" to its "out" position. Movement of the spool 790 to its "out" position causes retraction of the rear chamber opening-and-closing mechanism cylinders 516,518. As the cylinders 516,518 retract, the upper frame 324 pivotally moves downwardly from its upper position 574 of FIG. 7 toward its lower position.

FIG. 22 illustrates the upper frame 324 of the rear chamber 70 having moved downwardly until it reached its partially opened position 572 of FIG. 7 at which position its movement was stopped and it remains there until the roll core has been transferred into the rear chamber 70 from the front chamber 68.

Specifically, termination of the movement of the upper frame 324 at its partially opened position 572 occurs when the secondary control valve spool 794 is moved from its "upper" position of FIG. 17A to its "lower" position of FIG. 22A due to engagement of the front end of lever 818 on the actuating arm 766, which moves downwardly with the upper frame 324, with the flat plate 820 fixed on the upper end of the secondary valve spool 794. While the rear end of the rear chamber 70 is now partially opened (or partially closed), the pivotal arms 484,486 which control the height of the front inlet opening to the rear chamber 70 are still held at their raised positions by springs 528,530, whereby the height dimension of the rear chamber inlet opening is still at a maximum and sufficiently large enough to allow transfer of the roll core therethrough when discharged from the front chamber 68.

Although the roll core illustrated in FIG. 22 has still not yet reached its desired maximum diameter size at which it would be ready for transfer to the rear chamber 70, the position of the over-centering lever roller 972 has been changed from its right seat position D, shown in FIG. 21A, to just to the left side of the apex on the detent plate 966 as shown in FIG. 22A. Such change is brought about due to rearward movement of the front chamber slide bar 960 via cable 1004 which is pulled rearwardly when the second pivotal actuator 956 is pivoted clockwise upon being engaged by tab 1008 on the actuating arm 766 when the latter is moved downwardly with the upper frame 324 from the upper position to the partially opened position of the upper frame 324. The slide bar 960 is prevented from moving further rearwardly, which would allow the over-centering lever roller 972 to reach its left seat position U on detent plate 966 and thereby initiate opening of the rear end of the front chamber 68, due to engagement of the slideable lock 958 with the rear side of the front shoulder 1022 on the front chamber slide bar 960, as seen in FIG. 22A.

In FIG. 23, the roll core in the front chamber 68 has now reached its desired size and is ready for transfer to the rear chamber 70. Therefore, the rear end of the front chamber 68 is in the process of opening so that the lower apron 80 can carry the roll core through the rear chamber inlet opening and into the rear chamber, as shown in phantom in FIGS. 23 and 24.

Opening of the front chamber 68 occurs as follows. As the roll core in the front chamber 68 grows in size, the takeup-and-expansion mechanism 122 of the front chamber is caused to rotate counterclockwise (in yielding to expansion of the front upper apron 120) to the point where the slideable lock 958 is lifted above the front shoulder 1022 on the front chamber slide bar 960 and the latter is thereby released by the lock 958 and allowed to move further rearwardly until over-centering lever roller 972 reaches its left seat position, shown in FIG. 23A. Such further rearward movement of the slide bar 960 causes the front chamber control valve spool 980 to move to its "in" position. Movement of the spool 980 to its "in" position causes retraction of the front chamber opening-and-closing mechanism cylinder 254 and thereby simultaneous upward pivoting of swingable arms 256,258 and downward pivoting of the floor ramps 282, as well as termination of the clockwise movement of the front upper apron 120.

FIG. 24 shows the rear end of the front chamber 68 completely opened, as seen earlier in FIG. 17. The roll core has been moved by lower apron 80 through the rear open end of the front chamber 68, through the enlarged front inlet opening of the rear chamber 70 and onto the bale trip paddle 804 in the floor of the rear chamber 70 which depressed the paddle 804 and thereby via cable 802 and lever 762 pushed the secondary control valve spool 794 upwardly from its "lower" position, shown in FIG. 22A, back to its "upper" position, as seen in FIG. 24A. Movement of the spool 794 to its "upper" position causes the rear chamber opening-and-closing mechanism cylinders 516,518 to fully retract and the upper frame 324 to pivot downwardly from its partially raised position of FIG. 23 to its fully lowered position of FIG. 24 which fully closes the rear end of the rear chamber 70, and simultaneously the pivotal arms 484,486 to move downwardly to their lower positions which reduces the height dimension of the rear chamber front inlet opening to a minimum.

Also, the complete lowering of the upper frame 324 initates clockwise movement of the rear upper apron 326 which is now draped over the roll core and continues to add incoming crop material about the outersurface of the roll core in the rear chamber 70.

The successive stages in the continuous operations performed by the machine 10 are now repeated beginning with completion of the rear chamber roll forming operation, as shown in FIG. 18.

It is thought that the invention and many of its attendant advantages will be understood from the foregoing description and it will be apparent that various changes may be made in the form, construction and arrangement of the parts of the machine described without departing from the spirit and scope of the invention or sacrificing all of its material advantages, the form hereinbefore described being merely a preferred or exemplary embodiment thereof.

Having thus described the invention, what is claimed is:

1. A method of forming crop material rolls by a mobile machine adapted to move across a field and having first and second roll forming chambers, comprising the steps of:
moving the machine across the field;
delivering crop material to said machine;
completing formation of a roll of crop material in said second chamber;
initiating formation of another roll of crop material in said first chamber prior to the termination of completing formation of the preceding roll in said second chamber;
said initiating step including the step of forming said another roll of crop material in said first chamber to a first size; and
said completing step including the step of forming said roll of crop material in said second chamber to a second size greater than said first size.

2. A method of recited in claim 1, wherein said completing step includes the step of wrapping said roll with twine or the like in said second chamber.

3. A method as recited in claim 1, wherein said completing step is terminated by the step of discharging said roll from said second chamber.

4. A method as recited in claim 3, further comprising the step of transferring said another roll from said first chamber to said second chamber after discharge of said roll from said second chamber.

5. A method of forming crop material rolls by a mobile machine adapted to move across a field and having first and second roll forming chambers, comprising the steps of:
moving the machine across the field;
delivering crop material to said machine;
initiating formation of a roll of said crop material in said first chamber;
completing formation of said roll in said second chamber; and
initiating formation of another roll in said first chamber prior to termination of completing formation of the preceding roll in said second chamber;
each of said initiating steps including the step of forming said respective roll of crop material in said first chamber to a first size; and
said completing step including the step of forming said roll of crop material in said second chamber to a second size greater than said first size.

6. A method as recited in claim 5, wherein said completing step includes the step of wrapping said roll with twine or the like in said second chamber.

7. A method as recited in claim 5, wherein said completing step is terminated by the step of discharging said roll from said second chamber.

8. A method as recited in claim 7, wherein said formation of said another roll in said first chamber is initiated prior to discharging of the preceding roll from said second chamber.

9. A method of forming crop material rolls by a mobile machine adapted to move across a field and having first and second roll forming chambers, comprising the steps of:
moving the machine across the field;
delivering crop material from the field to said machine;
initiating formation of a roll of crop material in said first chamber;
transferring said roll from said first chamber to said second chamber;
completing formation of said roll in said second chamber;
discharging said completed roll from said second chamber;
initiating formation of another roll in said first chamber prior to discharge of the preceding roll from said second chamber; and
said completing step including th step of forming said roll in said second chamber to a size greater than the size reached in said first chamber.

10. A method as recited in claim 9, wherein said completing step includes the step of wrapping said roll with twine or the like in said second chamber.

11. A method as recited in claim 9, wherein said formation of said another roll in said first chamber is initiated upon termination of completing formation of said roll located in said second chamber.

12. A method of forming crop material rolls by a mobile machine adapted to move across a field and having tandemly-arranged front and rear roll forming chambers, comprising the steps of:
moving the machine across the field;
maintaining a rear end of said front chamber open;
delivering crop material through said front chamber, and into said rear chamber;
forming said crop material delivered to said rear chamber into a roll thereof;
completing the formation of said roll of crop material in said rear chamber;
closing the rear end of said front chamber prior to termination of said completing step to cease delivery of crop material into said rear chamber; and
initiating the formation of another roll of crop material in said front chamber prior to termination of said completing step.

13. A method as recited in claim 12, wherein said completing step includes the step of wrapping said roll with twine or the like in said rear chamber.

14. A method as recited in claim 12, wherein said completing step is terminated by the step of discharging said roll from said rear chamber.

15. A method as recited in claim 14, further comprising the steps of:
opening said rear end of said front chamber after discharge of said roll from said rear chamber; and
transferring said another roll from said front chamber to said rear chamber.

16. A crop material roll forming machine, comprising:
a mobile frame adapted to move across a field;
means on said frame for delivering crop material to said machine;
first means on said frame for initiating formation of a roll of crop material to a first size; and
second means on said frame for completing formation of said roll to a second size greater than said first size, said first means being operable to initiate formation of another roll prior to completion of the preceding roll by said second means.

17. A machine as recited in claim 16, further comprising means on said frame operable to cause wrapping of said roll with twine or the like upon its completion by said second means.

18. A machine as recited in claim 16, wherein said second means is operable to discharge said preceding roll upon its completion.

19. A machine as recited in claim 18, further comprising means for causing transfer of said another roll from said first means to said second means after discharge of said preceding roll by said second means.

20. A crop material roll forming machine, comprising:
a mobile frame adapted to move across a field;
means on said frame for delivering crop material to said machine;
rear means on said frame for completing formation of a roll of crop material;
front means on said frame for initiating formation of another roll of crop material prior to completion of the preceding roll by said rear means;
said front means being operable to form a roll to a first size; and
said rear means being operable to form said roll to a second size greater than said first size.

21. A machine as recited in claim 20, further comprising means on said frame operable to cause wrapping of said roll with twine or the like prior to its completion by said rear means.

22. A machine as recited in claim 20, wherein said rear means is operable to discharge said preceding roll upon its completion.

23. A machine as recited in claim 22, further comprising means on said frame associated with said front and rear means for causing transfer of said another roll from said front means to said rear means after discharge of said preceding roll by said rear means.

24. A crop material roll forming machine, comprising:
a mobile frame adapted to move across a field;
a front roll forming chamber on said frame;
a rear roll forming chamber on said frame including means for completing formation of a roll therein;
means on said frame for opening and closing the rear end of said front chamber;
means on said frame for delivering crop material to said front chamber when its rear end is closed and for delivering crop material to said rear chamber when the rear end of said front chamber is open;
said completing means of said rear chamber being operable to form said crop material delivered thereto into a roll thereof; and
said front chamber including means for initiating formation of another crop material roll therein prior to the termination of completing formation of the preceding roll in said rear chamber.

25. A machine as recited in claim 24, further comprising means on said frame associated with said rear chamber and operable to cause wrapping of said roll with twine or the like prior to its completion in said rear chamber.

26. A machine as recited in claim 24, wherein said means of said rear chamber is operable to discharge said roll upon its completion.

27. A machine as recited in claim 26, further comprising means on said frame associated with said front and rear chambers for causing transfer of said another roll from said front chamber to said rear chamber after discharge of said preceding roll from said rear chamber.

28. A machine as recited in claim 24, wherein:
said means of said front chamber is operable to form a roll to a first size; and
said means of said rear chamber is operable to form said roll to a second size greater than said first size.

29. A crop material roll forming machine, comprising
a mobile frame adapted to move across a field;
means on said frame for delivering crop material from the field to the machine;
first means on said frame for receiving crop material so delivered and initiating formation of a roll thereof; and
second means on said frame for receiving said roll from said first means and additional crop material so delivered to complete formation of said roll, said second means being operable to discharge said roll from said machine after completion thereof, said first means being operable to initiate formation of another roll after completion and prior to discharge of the preceding roll from said machine by said second means.

30. A machine as recited in claim 29, further comprising means on said frame associated with said second means and operable to cause wrapping of said roll with twine or the like after its completion but prior to its discharge by said second means.

31. A machine as recited in claim 30, wherein said machine is adapted to continuously move across the field during operation of each of said first, second and wrapping means.

32. A method of forming crop material rolls by a mobile machine adapted to move across a field and having a roll supporting means, comprising the steps of:
moving the machine across the field;
delivering crop material to one end of said roll supporting means of said machine;
forming said crop material into a roll on said roll supporting means;
conveying said delivered crop material from said one end to proximate another end of said roll supporting means during the formation of at least a portion of said roll on said roll supporting means;
discharging said crop material roll from said another end of said roll supporting means; and
initiating formation of another roll on said roll supporting means prior to completion of discharge of said roll from said another end of said roll supporting means.

33. A crop material roll forming machine, comprising:
a mobile frame adapted to move across a field;
roll supporting means on said frame;
means on said frame for delivering crop material to one end of said roll supporting means; and
means on said frame operable for forming said crop material into a roll on said roll supporting means and for discharging said crop material roll from another end of said roll supporting means, said forming and discharging means further being operable for initiating formation of another roll on said roll supporting means prior to completion of discharge of said roll from said another end of said roll supporting means; and means for conveying said delivered crop material across said roll supporting means from said one end thereof to proximate said another end thereof during the formation of at least a portion of said roll on said roll supporting means.

34. A machine as recited in claim 33, wherein said roll supporting means is comprised by a generally horizontal rigid floor.

* * * * *